United States Patent [19]
Pasierb, Jr.

[11] Patent Number: 4,871,167
[45] Date of Patent: Oct. 3, 1989

[54] GENERAL PURPOSE DISPLAY CONTROLLER FOR ELECTRONIC GAMES

[75] Inventor: John J. Pasierb, Jr., Schaumburg, Ill.

[73] Assignee: Bally Manufacturing Corporation, Chicago, Ill.

[21] Appl. No.: 764,503

[22] Filed: Aug. 8, 1985

Related U.S. Application Data

[63] Continuation of Ser. No. 388,883, Jun. 16, 1982, abandoned.

[51] Int. Cl.$^4$ .............................................. A63F 9/00
[52] U.S. Cl. .................................................. 273/1 E
[58] Field of Search ................ 364/146, 188; 273/1 E, 273/DIG. 28; 340/702, 703, 712, 722

[56] References Cited

U.S. PATENT DOCUMENTS

| | | | |
|---|---|---|---|
| 4,026,555 | 5/1977 | Kirschner et al. | 273/DIG. 28 |
| 4,107,665 | 8/1978 | Mayer et al. | 273/DIG. 28 |
| 4,116,444 | 9/1978 | Mayer et al. | 273/DIG. 28 |
| 4,119,955 | 10/1979 | Nichols | 340/324 AD |
| 4,148,073 | 4/1979 | Slobodzian et al. | 358/240 |
| 4,177,462 | 12/1979 | Chung | 340/703 |
| 4,232,374 | 11/1980 | Chung et al. | 364/900 |
| 4,324,401 | 4/1982 | Stubben et al. | 273/DIG. 28 |
| 4,418,381 | 11/1983 | Molusis et al. | 364/162 |
| 4,500,879 | 2/1985 | Smith et al. | 273/1 E |

FOREIGN PATENT DOCUMENTS 0008324 6/1979 European Pat. Off. .

OTHER PUBLICATIONS

Giloi, W. *Interactive Computer Graphics*, Englewood Cliffs, N.J., Prentice-Hall, 1978 pp. 249-256.
Newman, W. M. and Sproull, R. F., *Principles of Interactive Computer Graphics*, N.Y., McGraw-Hill, 1979, Ch. 26.

*Primary Examiner*—Leo P. Picard
*Attorney, Agent, or Firm*—McAndrews, Held & Malloy, Ltd.

[57] ABSTRACT

A general purpose controller suitable for use with an electronic amusement game having a raster scan display receives game data from the game during vertical blank periods, the game data specifying object images and their screen positions desired for the next display in the sequence of raster scan displays. The controller then reads color/intensity information for each display pixel out of permanent memory at the time the pixel is displayed on the raster scan display surface. An embodiment is described capable of controlling up to 32 object images in the play of a game.

9 Claims, 23 Drawing Sheets

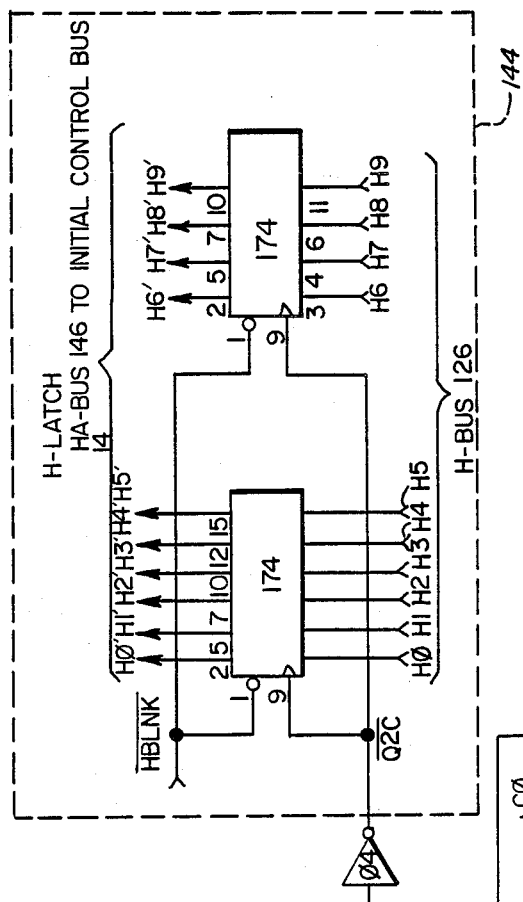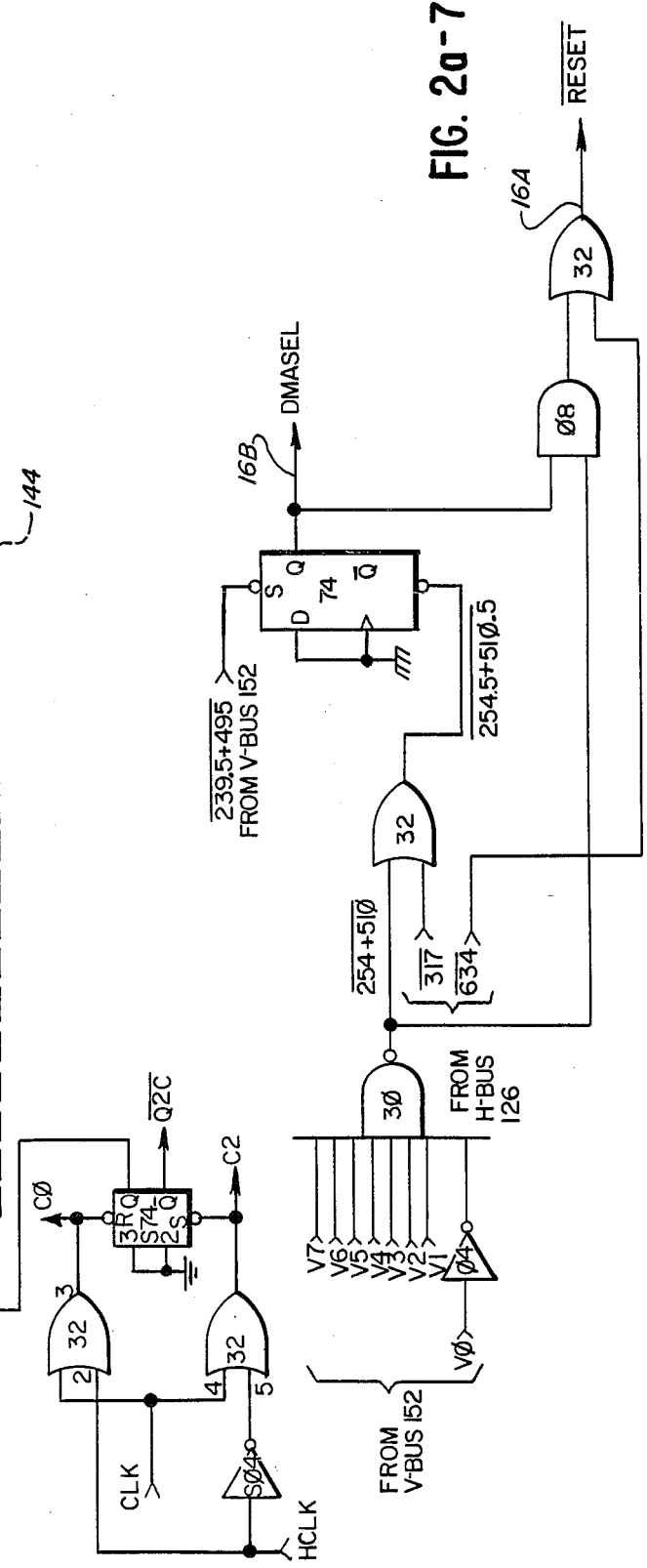
FIG. 2a-6
FIG. 2a-7

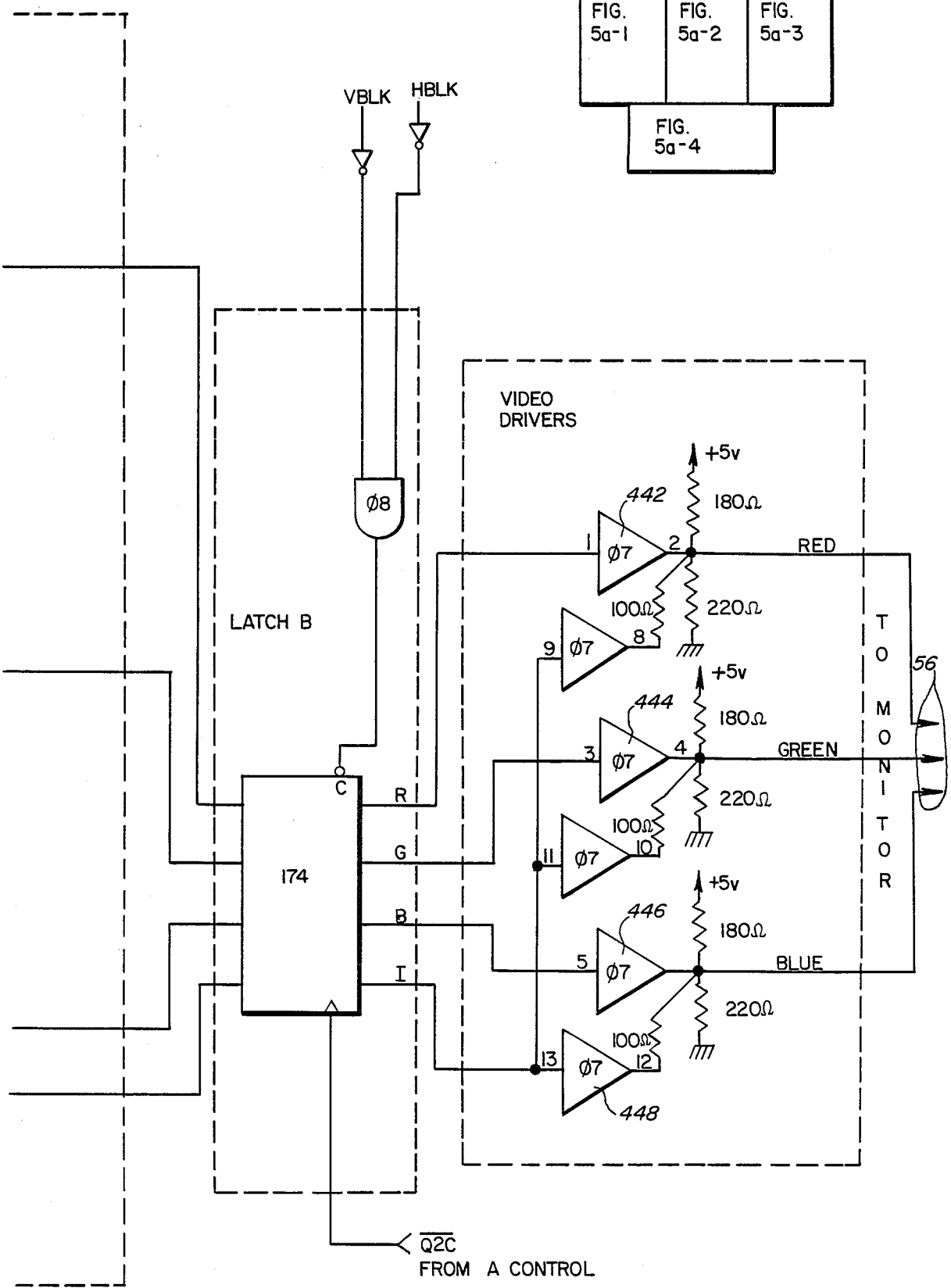

GENERAL PURPOSE DISPLAY CONTROLLER FOR ELECTRONIC GAMES

This application is a continuation of application Ser. No. 388,883, filed June 16, 1982 now abandoned.

BACKGROUND OF THE INVENTION

This invention pertains to the display of a multiplicity of moving objects on a raster scan display during the play of an electronic video game. More particularly, this invention relates to a method and inexpensive implementing display circuitry for producing signals for controlling the display of a large number of objects on a color TV monitor in a game controlled, for example, by a microprocessor.

The approach taken earlier in microprocessor-based video game displays has been to create a memory "map" by writing into a memory information defining an entire frame to be displayed, as discussed in U.S. Pat. No. 4,177,462 issued to Chung. Chung attempts to liberate the game microprocessor from the arduous and very time-consuming task of preparing a memory map. He is thereby able to achieve a substantially improved capability for displaying and moving substantial numbers of objects on a screen. Chung's invention does, however, continue to impose severe constraints upon the game microprocessor. Chung permits game control information to be placed in the permanent memory of the game display, thereby requiring extensive communication between the game microprocessor and the display circuitry. Furthermore, he requires that both the game microprocessor and the display circuitry operate synchronously off a single clock. The game microprocessor must become inactive during all communication periods and therefore time is taken or "stolen" from the game microprocessor's available time for performing game-associated computations. Finally, Chung discloses a construction using content addressable memories which are highly specialized, and therefore expensive, devices.

The objects of the present invention may be accomplished by using high speed processor means for keeping track of video screen locations where objects are to be displayed. Signals that cause the display of the particular object are then read out of a permanent memory at the time the signals are needed to control the color gun and intensity amplifiers which, in turn, control the monitor. A specific construction of an embodiment of the high speed processor means is disclosed in the present applicant's concurrently filed application entitled "High Speed CPU/sequencer for Video Games."

The method and circuitry are of very general application. The generality results in part from the need for limiting communication between the game controller, e.g., a microprocessor, and the game control circuitry to a short period of time during vertical blanking of a raster scan display device. The display circuitry thereby operates substantially independently of the game details. The only game specific portion of the circuitry is contained in the permanent memory which contains the representations of the objects that are to be displayed. The game microprocessor, consequently, need only supply during vertical blanking the identities of the objects to be displayed and coordinates defining the display positions and widths of the objects to be displayed. Further independence is achieved by providing different means for clocking the microprocessor and the display circuitry, although it is entirely feasible to run both off a single basic clock.

SUMMARY OF THE INVENTION

A specific construction embodying principles taught by the invention controls a raster scan color TV monitor. One such is commercially available from Electrohome, Kitchener, Ontario, Model 38-07905-00. A single display on the monitor comprises 479 horizontal lines. Each horizontal line is divided for control purposes into 512 discrete adjacent parts, known as pixels. The division into pixels is only conceptual; horizontal line scanning by the monitor ordinarily results in an essentially continuous line.

A single display includes two frames, each comprising a vertical sweep of the monitor face. The first frame displays the even numbered lines, 0–476 and the first one-half of line 478. The second frame displays the second half of line 1 and the remaining odd numbered lines through line 479. Each frame occurs in a time lapse of 15.2 ms., followed by a 1 ms. blanking period, which will be referred to as VBLK. The raster thereby presents approximately 30 frames per second.

Each horizontal line is swept in a horizontal sweep time of about 51.2 microsec. followed by an approximately 12.2 microsec. blanking period which will be referred to as HBLK.

The color controller display circuitry, in the specific construction, controls three color gun amplifiers and an intensity amplifier which, in turn, control the monitor display.

Objects to be displayed during the play of a game are coded into an object ROM. A 32×2048 bit ROM is required to encode 16 objects, where each object occupies 128 memory locations in the ROM, each location providing 32 bits of storage. The 32 bits of storage are utilized as 4-bit color and intensity data for each pixel of a group of 8 pixels along a horizontal line. The 128 locations may therefore be used to encode a pattern within a rectangle 32 lines high and four 8-pixel groups wide. The pattern within the rectangle is a representation of one object to be displayed. The rectangle may be greater or less than four 8-pixel groups wide or 32 lines high. It is only necessary that the number of 8-pixel groups width times the number of lines height not exceed 128, in the specific construction.

A 32×4096 bit ROM could just as well be used within the teachings of the present invention to encode up to 32 different objects. The use of larger or smaller ROM's is generally dictated by considerations of economy and availability and is not a critical feature of the invention.

The 16 objects coded into rectangular patterns in the ROM are not associated with any particular screen positions. It is a function of the controller to place particular objects at particular screen locations for each display on the monitor face. The objects may be caused to appear at different locations on successive displays in order to give the appearance of motion.

The controller is therefore provided with the screen location of the display position of each object to be displayed during each display on the monitor face. In a monitor which is drawing lines from left to right (as viewed by a viewer) and drawing successive lines underneath each other, it is convenient to specify the upper left-hand corner location of the rectangle containing an object. The upper left-hand corner location can be specified as a line number and a horizontal pixel number.

The teachings of the invention may, consequently, be embodied in a CPU/sequencer which is provided with a beginning line number and beginning horizontal pixel number for each object to be displayed in the course of a single display. The controller may determine prior to the beginning of each horizontal line whether the particular line lies within the vertical line range of any currently displayed objects. For each such object the controller needs only the starting horizontal pixel address on the current line. Immediately after a horizontal pixel counter counts to the value of the address, the controller sequentially latches four 32-bit data groupings out of ROM on every eighth count of the horizontal pixel counter. Each grouping then provides 4-bits of color/intensity information for each of the next eight pixels.

A feature of the embodiment is the use of a high speed CPU/sequencer to control processing of data for a line prior to the 12.2 microsec. HBLK period preceding that line. A specific construction of the CPU/sequencer is described in the aforementioned concurrently filed application, incorporated herein by reference.

Use of the CPU/sequencer obviates the need to provide a map of an entire display between displays. The CPU/sequencer loads a RAM RC and a RAM RD with data for each object to be displayed on the horizontal trace following the next HBLK. The data consists substantially of starting horizontal pixel numbers for objects to be displayed and object ROM addresses and widths for each object. A fast hardware loader comprising a control CA and a control CC then loads a RAM line buffer and a RAM RE during each HBLK period from RAM RC and RAM RD. The fast hardware loader issues a sequence of "writes" which causes fast data transfer of data from one RAM to another.

The controller then determines from the data in the RAM line buffer when the current display pixel is the starting pixel for display of an object. Upon reaching each a starting pixel the controller uses the RAM RE data to cause the object ROM to read out 8 pixel groupings of color/intensity data corresponding to the object to be displayed. The 8 pixel data groupings are then broken down into individual pixel data, which data is fed to the color guns synchronously with the display of the pixel.

The objects to be displayed during each display, and their screen locations, are identified by data loaded into a RAM RB during each VBLK period by a slower NMOS microcomputer used in the specific construction described herein for game control and bookkeeping. The microcomputer does not have to provide a complete map of the display and is therefore free to devote most of its time to game control functions. The computer need only identify the objects to be presented and their screen locations. There is therefore no great burden upon the microcomputer in handling large numbers of variable sized objects.

The specific construction described herein is capable of manipulating up to 32 objects at a time. The limiting factor is the speed of the CPU/sequencer which is governed by the basic clock rate. The speed could be increased by an order of magnitude by use of a different technology than used in the present specific construction, e.g. emitter coupled logic. The limitation to 32 objects is therefore not inherent to the invention.

Persons skilled in the art of video game construction will therefore appreciate that one object of the present invention is to provide a substantially self-contained circuit which can economically control the display of a large number of objects on a color video screen.

Another object is to provide control circuitry which substantially frees the game microcomputer from display duties and thereby permits the microcomputer to devote its time to game-associated computations.

Other objects, advantages and features of the invention will become readily apparent from the following detailed description, particularly when taken in conjunction with the accompanying drawings.

BRIEF DESCRIPTION OF THE DRAWINGS

FIGS. 2a-1 to 2a-7 together comprise a circuit diagram of a particular implementation of the A-control section shown in FIG. 2, related as shown in FIG. 2a-8;

FIG. 3 is a diagrammatic illustration of the B-control section of the video display circuit shown in FIG. 1;

FIGS. 3a-1 to 3a-5 together comprise a circuit diagram of a particular implementation of the B-control section shown in FIG. 3, related as shown in FIG. 3a-6;

FIG. 4 is a diagrammatic illustration of a control CB subsection of the readout section of the video display circuit shown in FIG. 1;

FIG. 5 is a diagrammatic illustration of the readout and color interface section of the video display circuit shown in FIG. 1;

FIGS. 5a-1 to 5a-4 together comprise a circuit diagram of a particular implementation of the readout and color interface sections shown in FIG. 5, related as shown in FIG. 5a-5;

FIG. 6 is a diagrammatic illustration of the input section of the video display circuit shown in FIG. 1; and FIGS. 6a-1 to 6a-3 together comprise a circuit diagram of a particular implementation of the input section shown in FIG. 6, related as shown in FIG. 6a-4.

DETAILED DESCRIPTION OF A PREFERRED EMBODIMENT

Figure 1:
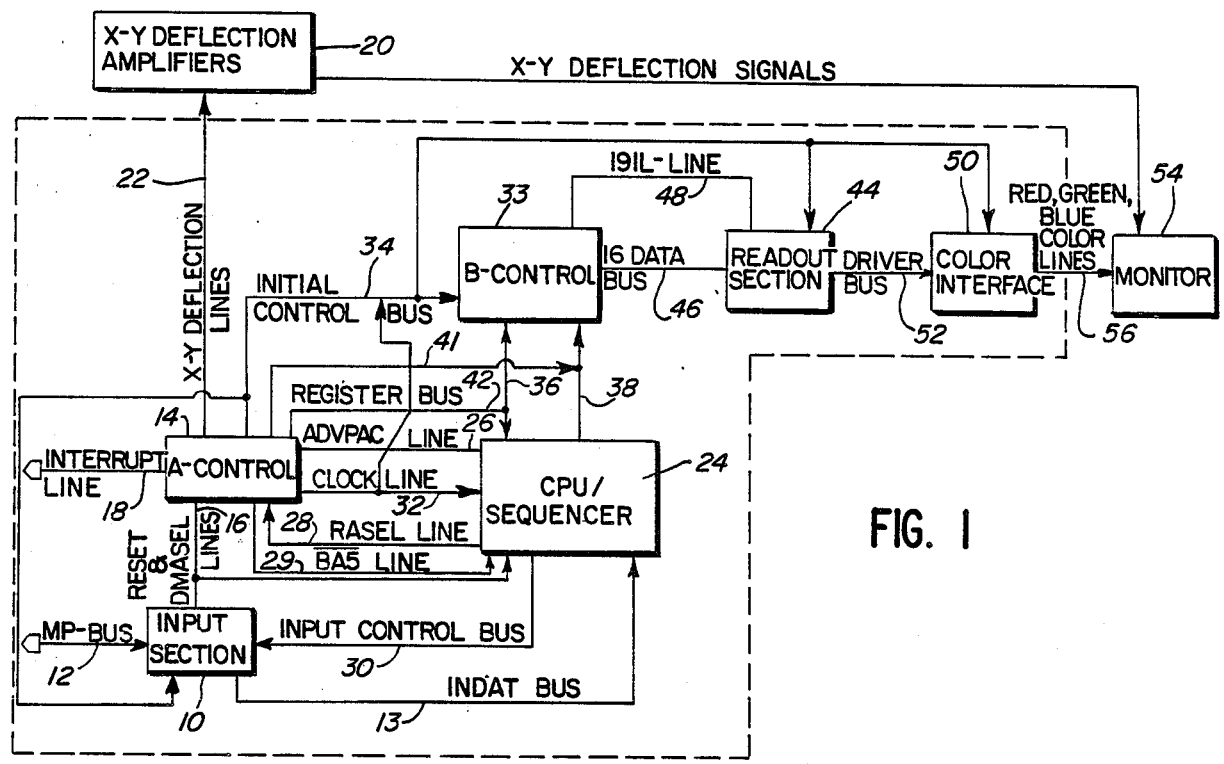
FIG. 1 is a diagrammatic illustration of the major components of a preferred embodiment of a video display circuit for a video game in accordance with the present invention.

An example of a preferred embodiment of principles taught by the present invention may be seen in FIG. 1 as comprising the following components:

1. An input section 10 connected to a microprocessor 11 (see FIG. 6) by an MP bus 12, the MP bus carrying information from the microprocessor, the input section outputting game data on an INDAT bus 13;

2. An A-control section 14 connected to the input section 10 by RESET and DMASEL lines 16 and to the microprocessor 11 by an interrupt line 18, the A-control section also activating x-y deflection amplifiers 20 by transmitting signals on x-y deflection lines 22;

3. A high speed CPU/sequencer 24 which is connected to the A-control section 14 by an ADVPAC line 26, a RASEL line 28 and a BA5* line 29 and to the input section 10 by an input control bus 30, the A-control section providing a clock line 32 for the CPU/sequencer, the CPU/sequencer also sensing the RESET and DMASEL lines 16;

4. A B-control section 33 which is connected to the A-control section 14 by an initial control bus 34, and to the CPU/sequencer 24 by an I/O bus 36, and an address bus 38, the address bus being also fed by a bus 41 from the A-control section 14, the initial control bus 34 also supplying data to the input section 10;

5. A register bus 42 which connects the A-control section 14 to the data bus 36;

6. A readout section 44 which is connected to the B-control section 33 by a 16 data bus 46, and a 191L-line 48, the readout section also sensing the initial control bus 34; and 7. A color interface 50 which is connected to the readout section by a driver bus 52 and to the three gun terminals of a raster scan color monitor 54 by red, green and blue color lines 56, the color interface also sensing the initial control bus 34, the color monitor also receiving x-y deflection signals from the x-y deflection amplifier.

Overall control of the game resides in the microprocessor 11, which in a specific construction of the embodiment may be a Z80 microprocessor made by Zilog.

A cycle begins at the beginning of a VBLK period when the raster scan monitor beam is turned off and is being positioned to begin displaying the first frame of a display from the top of the monitor screen, as the screen is normally viewed. The A-control 14 transmits an interrupt signal to the microprocessor 11 on the interrupt line 18 at approximately the instant the beam is turned off.

Upon receipt of the interrupt signal, the microprocessor 11 transmits data on the MP bus 12 to the input section 10 to indicate one or more objects or pictures that are to be displayed on the screen during the next display. The data on the MP bus 12 comprise generally locations in a memory where digital representations of the objects or pictures are stored and the screen positions where the objects are to be displayed. More specific discussion of the data will be given in connection with the description of the functioning of the input section 10. The memory is a principal component of the readout section 44. The data on the MP bus 12 are retained in temporary storage by the input section 10 during the cycle. Transmittal of data on the MP bus 12 to the input section 10 is completed during the time the monitor beam is positioned to begin its scan.

System operation is most readily described by starting with operation of the control sections.

The A-Control Section 14

Figure 2:
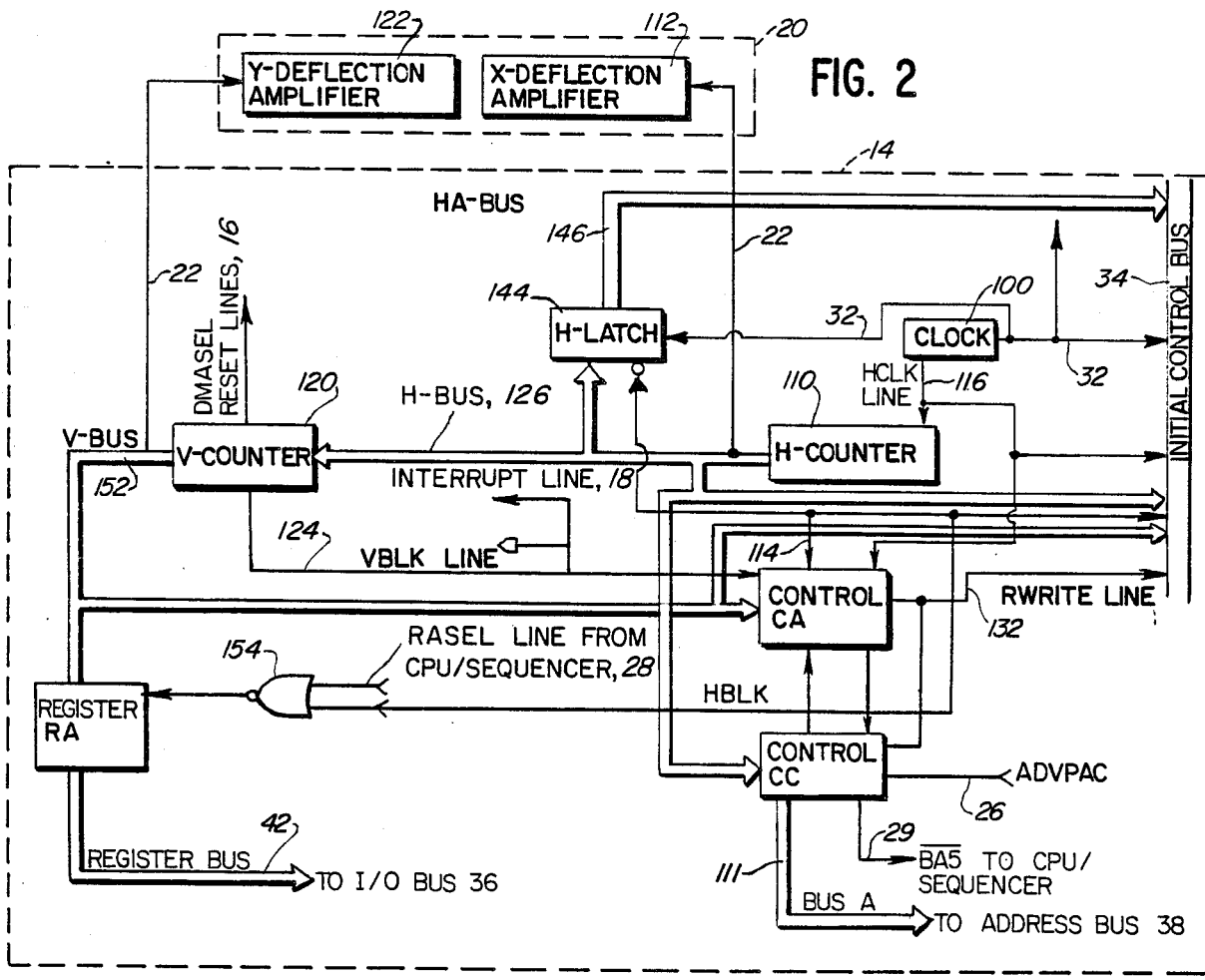
FIG. 2 is a diagrammatic illustration of the A-control section of the video display circuit shown in FIG. 1.

The A-control section 14, shown diagrammatically in FIG. 2 and in greater detail in FIGS. 2a-1 to 2a-7, is responsible for timing and activates the raster scan at the end of VBLK by turning the beam on and transmitting timing signals to the x-y deflection amplifiers 20. The A-control section also provides clock pulses to the high speed CPU/sequencer 24 and other components of the video display circuit. A specific construction of the preferred embodiment utilizes a clock 100 with a 50 ns. clock pulse cycle for timing, also outputting 100 ns. clock pulses on an HCLK line 116. An H-counter 110 controls an x-deflection amplifier 112 of the x-y deflection amplifiers 20. The H-counter counts out 512 pixels along each horizontal line beginning with count 0. The beam is then blanked for 122 counts of the H-counter by activation of an HBLK line 114 as may be seen explicitly in circuit diagram 2a-2. On count 634 the HBLK line 114 is deactivated and the H-counter reset to zero. In the specific construction the H-counter counts on 100 ns. HCLK pulses from the clock 100 transmitted on the HCLK line 116. The HCLK line is activated by the leading edge of positive pulses from the 50 ns. clock through a D-type flip-flop, as may be seen in FIG. 2a-1.

A V-counter 120 controls a y-deflection amplifier 122 of the x-y deflection amplifiers 20. The V-counter counts the horizontal lines from 0 to 511 and times the VBLK period by signals on a VBLK line 124 shown explicitly in the circuit diagram in FIG. 2a-4. As described earlier the y-deflection amplifier 122 causes alternate lines to be drawn on each vertical sweep.

The x-y deflection amplifiers 112, 122 are of known design and control the raster scan of the beam on the face of the TV monitor 54. The x-deflection amplifier 112 draws the horizontal lines, the y-deflection amplifier 122 produces the vertical displacements of succeeding horizontal lines.

In a specific construction of the embodiment the screen is blanked for 16 counts of V-counter 120, from count 239.5 to count 255.5 as the y-deflection is re-positioned to the center of line 1. The half vertical counts are obtained by adding a 317 count from the H-counter to the vertical count. The screen is then blanked again from V-counter counts 495 to 511. Each time the VBLK line 124 is activated on counts 239.5 and 495, an interrupt signal is transmitted to the microprocessor 11 on the interrupt line 18, as described earlier. On V-counter 120 count 255.5 the VBLK line is deactivated, and on count 511 the VBLK line is deactivated and the V-counter reset to zero.

The V-counter 120 is clocked by each 512th count of the H-counter 110, which causes a low on a 512* line from an H-bus 126. A 634* line low resets the H-counter. A 511* line within the V-counter is used to reset the V-counter at the end of line 511, that is, on the 634th horizontal count of line 511.

A control CA controls part of the data flow into a 1-of-2 multiplexer, and intermediate working memory, RAM RE, in the B-control section 33, as will be described. The control CA issues low pulses called "writes" on an RWRITE* line 132 in the initial control bus 34. The "*" symbol in "RWRITE*" indicates that the respective line is normally in a high state, as is also indicated by the "bar" superscript in the drawings. This convention is used throughout this application.

As shown explicitly in FIG. 2a-5 the control CA is enabled to issue write pulses during HBLK just prior to drawing one of the horizontal lines. Special treatment is accorded the first line of the second trace, which begins on vertical count 255.5, tracing a topmost line. The control CA begins emitting write instructions at the beginning of each such HBLK period. The write instructions, in the specific embodiment, issue on upward transitions on an H0 line from the H-counter which is the least significant digit on that counter. The H0 transitions correspond to alternate upward transitions on the HCLK line 116. The write instructions initiate a fast data transfer, as will be discussed.

A control CC counts the RWRITE* line 132 pulses. The number of pulses will be equal to the maximum number of objects controlled by the circuitry, 32 in the specific construction described herein.

A counter 133 is clocked by the least significant horizontal count H0 during HBLK, as shown in FIG. 2a-5. The counter 133 is cleared at the end of line number 511, and is also cleared prior to each horizontal line by a RESET* signal generated by logic illustrated in FIG. 2a-7. The RESET* signal is low on the 634th horizontal count of each displayed line and also during VBLK after the vertical counter has counted either to 254 or to 510. Because the vertical counter counts on the 512th horizontal count, the RESET* low pulses during VBLK occur a full horizontal line time before display of line 0 (first frame), and one-and-one half of a line time before display of the second half of line 1 (second frame).

The RESET* signal initiates operation of the CPU/-sequencer 24 as described more fully in the concurrently filed application. The CPU/sequencer issues 32 clock pulses on the ADVPAC line 26 during display of a horizontal line and also prior to the HBLK signals (during VBLK) during the undisplayed lines 254 and 510. The 32 pulses issue through an AND-gate 134 which is only enabled when HBLK is off. The 32 pulses clock the counter 133 which outputs its count from 0 to 31 on lines BA0 to BA4 to the address bus 38. When the BA5* line 29 to the CPU/sequencer goes low, the sequencer is disabled, as explained in the concurrently filed aplication, and the lines BA0–BA4 will carry logical lows indicating a binary representation of a count of 32 on the counter 133.

When HBLK is high the counter 133 counts on the H0 signals which are passed by an AND-gate 135, enabled by HBLK. An OR-gate 136 passes the outputs from either AND-gate 134 or 135 to the counter 133 clock pins. Clocking of the counter during VBLK does not affect the RWRITE* line 132 which is taken from an OR-gate output pin 136A-11. The RWRITE* line is forced high during VBLK by feeding the VBLK line into OR-gate 136A-13. In FIG. 2a-5 this is done for convenience through a second OR-gate 136B.

The RWRITE* line 132 is also forced high when the BA5* line 29 is low because the complement of BA5* is also fed to the OR-gate 136A via input pin 136A-12.

When VBLK is off and HBLK is on, the counter 133 first sequences through 32 H0 counts to clear the counter 133 which counts modulo 64. The RWRITE* line 132 is then enabled to follow the output pin 137-6 of an AND-gate 137. It will be seen that RWRITE* goes low when VBLK is off and the counter 133 clears.

While the counter 133 is cleared by sequencing through 32 H0 counts, the output pin of an AND-gate 138-6 responsive to HBLK and VBLK* went high with HBLK, still assuming that VBLK is off. The AND-gate 138 output is fed to an OR-gate input pin 139-4 whose other input 139-5 is, as will be seen, normally low. The OR-gate output pin 139-6 connects to the input pin 2 of a D-type flip-flop with clear 1030, clocked by H0. The flip-flop clear pin 1030-1 connects to the BA5* line from the counter 133. Because BA5* is low during the first 32 H0 counts, the flip-flop Q-output pin 5 is low. The Q-output connects to input pin 2 of an OR-gate 1032 whose other input pin 1030-1 connects to the complement of the H0 clock signal.

The OR-gate output pin 1032-3 connects to AND-gate input pin 137-3 with its other active input pin 5 connected to the H0 line. It may be seen, therefore, that the AND-gate output pin 6 will remain low when the flip-flop Q-output pin 1030-5 is low. The AND-gate output will follow the H0 signal when the Q-output pin is high. The RWRITE* line, as already described, will follow the AND-gate output pin 137-6 when the counter 133 clears.

When the counter 133 clears on a rise on the H0 line, the flip-flop clear pin 1030-1 goes high, enabling the flip-flop. The flip-flop Q-output continues to output a low, however, until the next H0 rise clocks in the high on D-input pin 1030-2. The Q-output low, coinciding with count 0 from counter 133, maintains the low on AND-gate pin 137-6 and consequently on RWRITE* throughout the duration of count 0. The next rise on H0 clocks a 1 into counter 133, a high on Q-output pin 1030-6, and a consequent high and low on RWITE* as it follows H0. The RWRITE* line will continue to follow H0 until there have been 32 low pulses. On the next H0 rise after the 32nd low, BA5* will go low to inactivate flip-flop 1030 while its complement fed to OR-gate input 136A-5 forces RWRITE* to go and remain high.

Provision is also made for special treatment of the topmost line of each trace. In the specific construction described herein, however, it was not found necessary to implement the special features because of the high resolution of the display.

Meanwhile, the numerical count in the H-counter is clocked into an H-latch 144 on the H-bus 126. The H-latch holds the current horizontal count from 0 to 511 and is then cleared by a pulse from an HBLK* line during the time HBLK is activated; that is, the latch resets to zero during screen blanking at the end of a line. The current horizontal count from 0 to 511 is carried to the B-control on an HA-bus 146 which is part of the initial control bus 34 shown in FIG. 1. The horizontal count is latched into the H-latch 144 near the middle of each high on the HCLK line 116 by a Q2C* pulse generated as shown in FIG. 2a-6.

The vertical count is carried to a register RA on a V-bus 152. Register RA in a specific construction of the embodiment may be a pair of Texas Instruments SN74S241 octal buffers in tandem. The V-bus inputs into one buffer and the inputs of the other buffer are grounded.

The register RA transmits the vertical count over the register bus 42 to the I/O bus 36 when the RASEL line 28 is set low by the high speed CPU/sequencer 24 and the HBLK line 114 is low, thereby putting a high as the output of a NOR gate 154.

The vertical counter 120 also activates the DMASEL and RESET* lines 16 during the time VBLK is activated. The DMASEL line deactivates before VBLK is deactivated. Activation of the RESET* line has already been described.

The interrupt line 18 carries the VBLK signal to the microprocessor 11 to indicate that the controller circuitry is ready to receive data for the next scan.

In the circuit diagrams, all TTL devices are designated by numbers having an initial "74" excised.

The B-Control Section 33

Figures 1, 2, 2A, 3, 4, 5, 6, 7, 8:
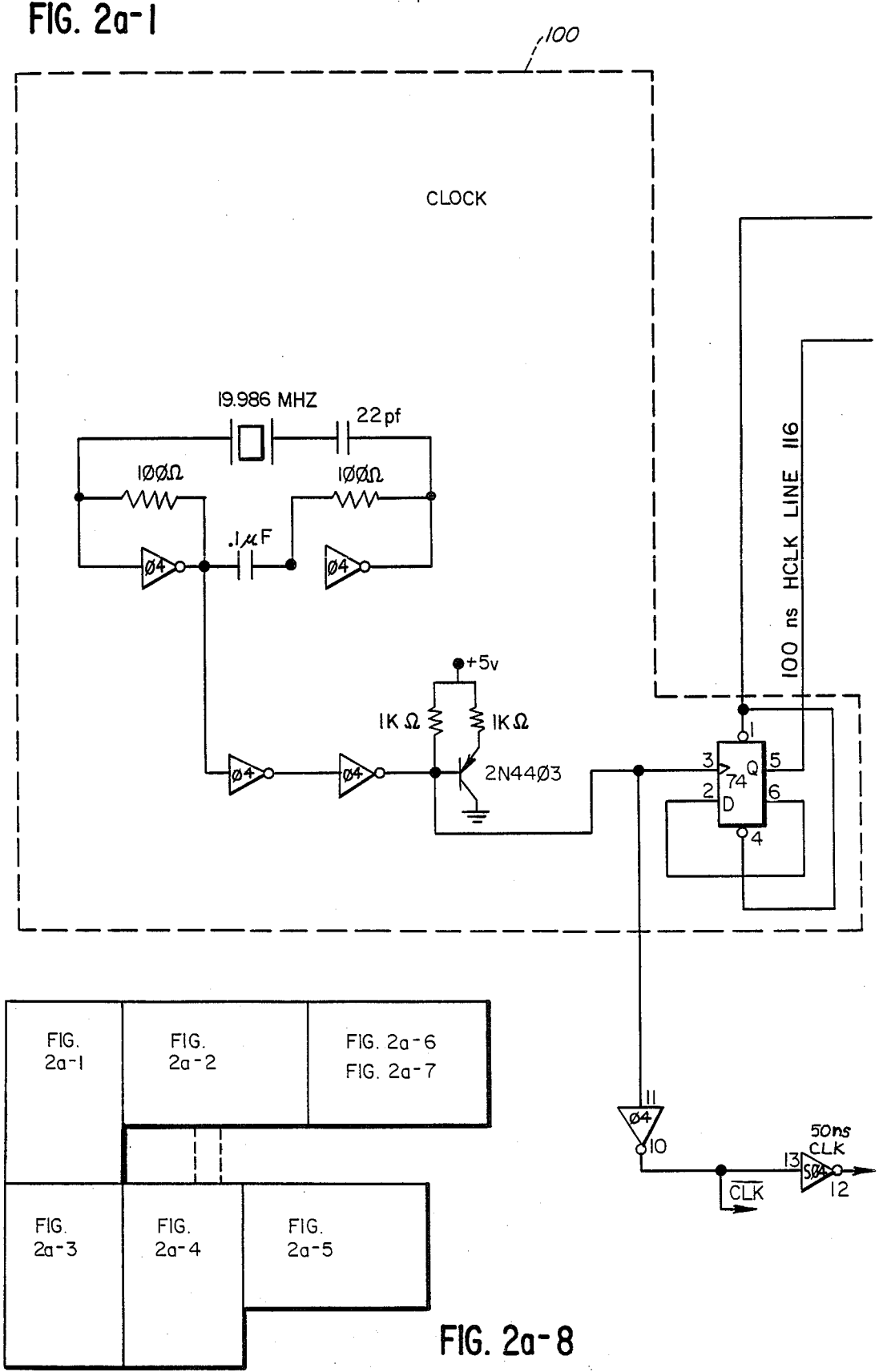
Figures 2, 2A:
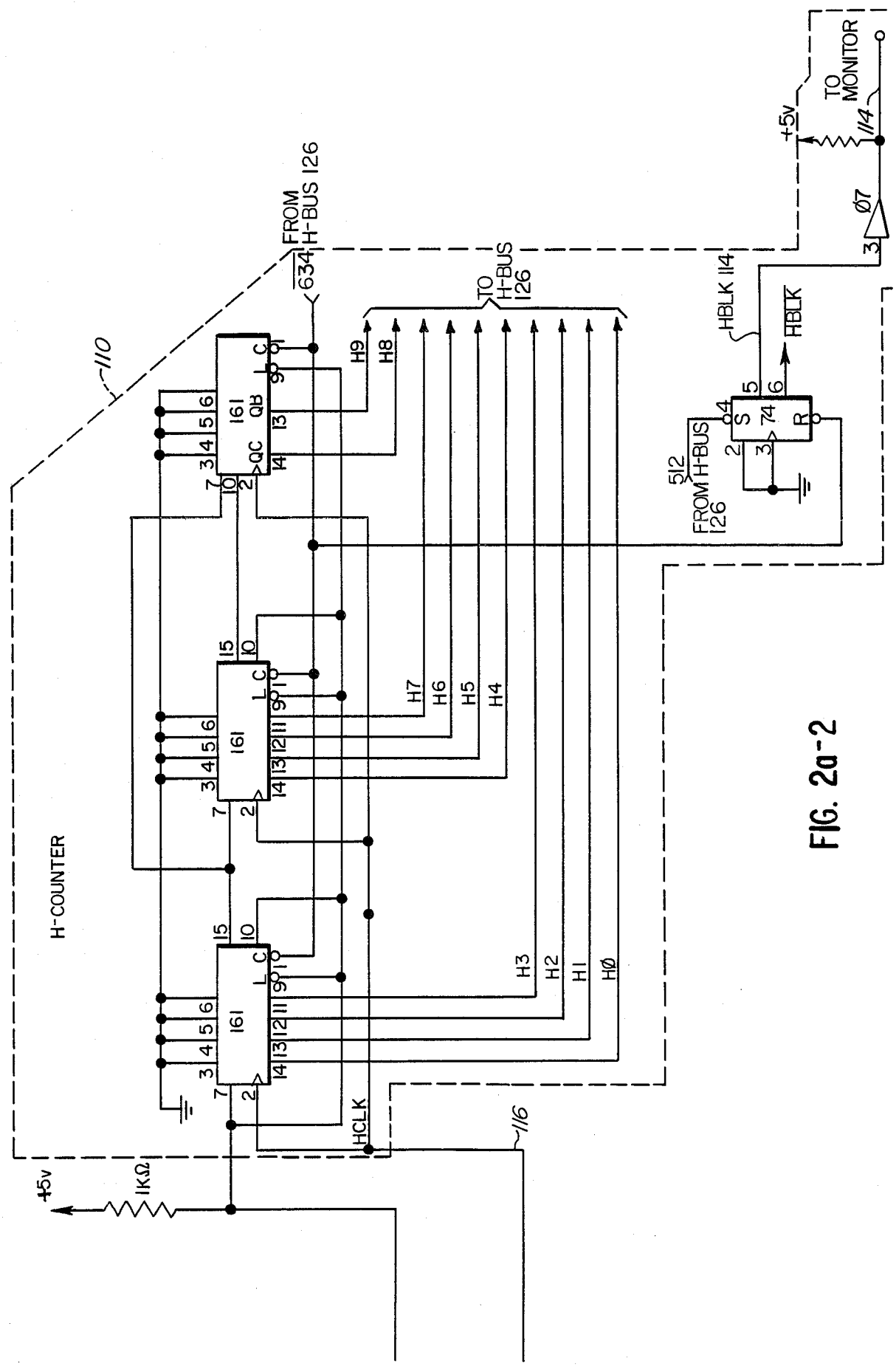
Figures 2, 2A, 3:
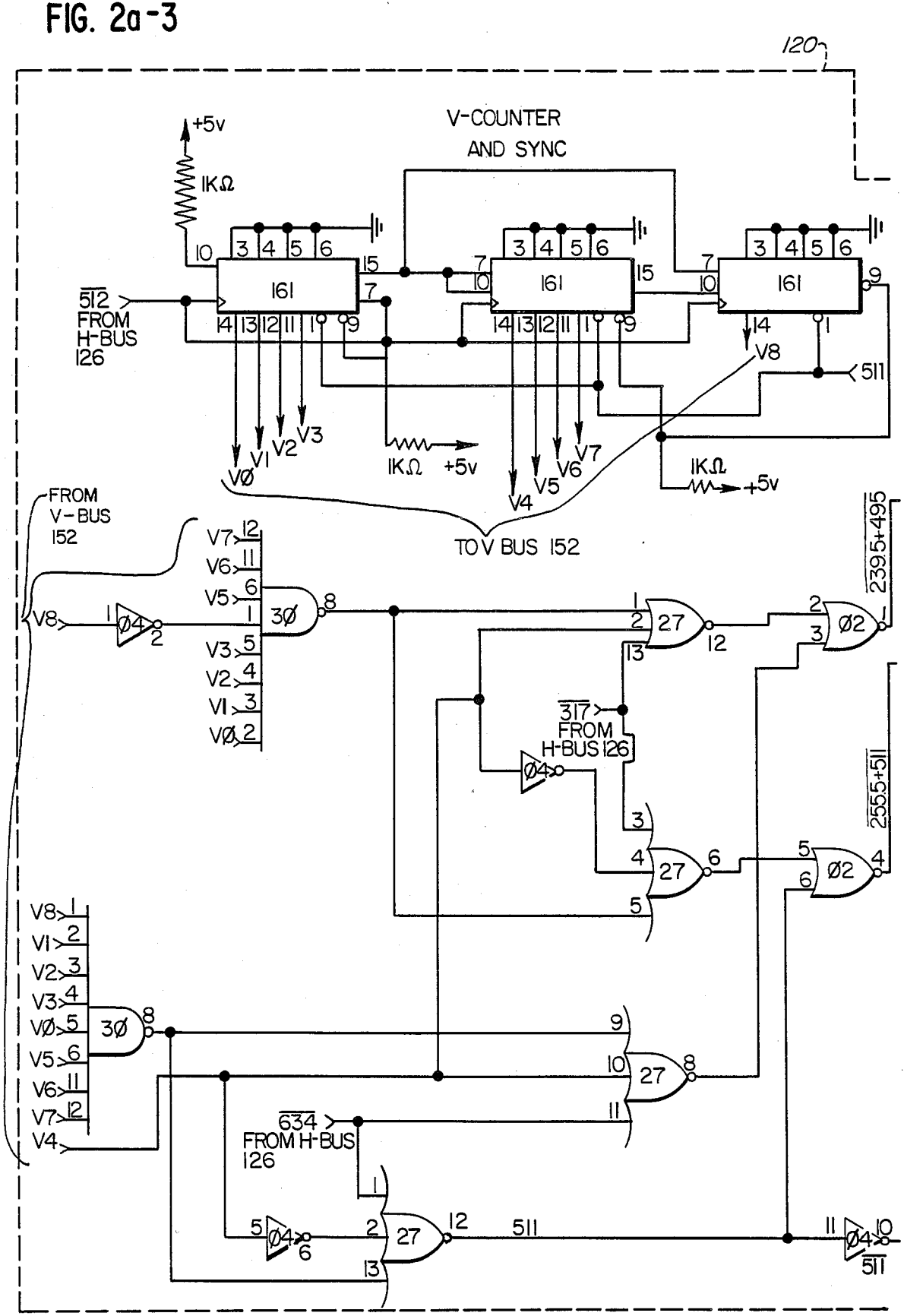
Figures 2, 2A, 3, 4:
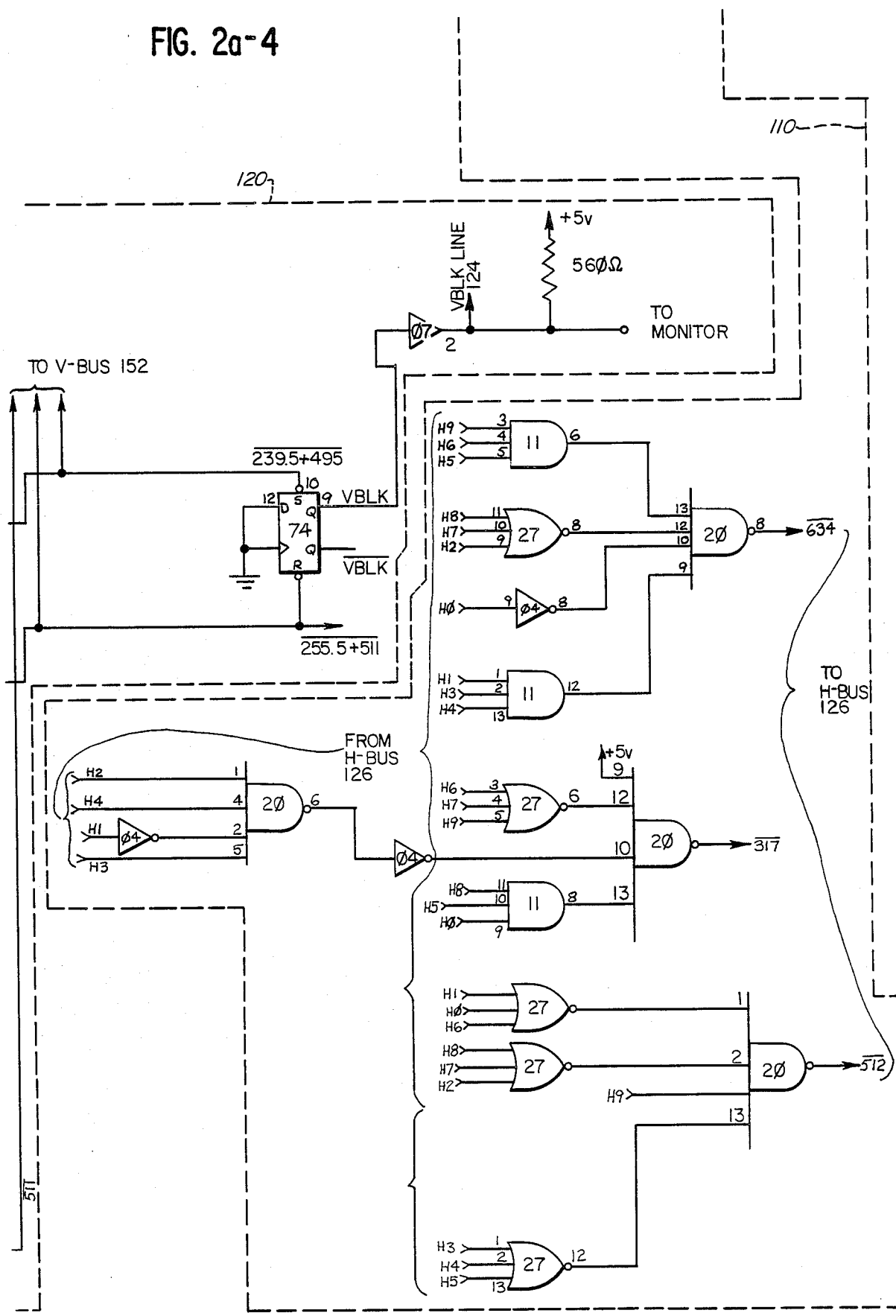
Figures 2, 2A, 3, 4, 5:
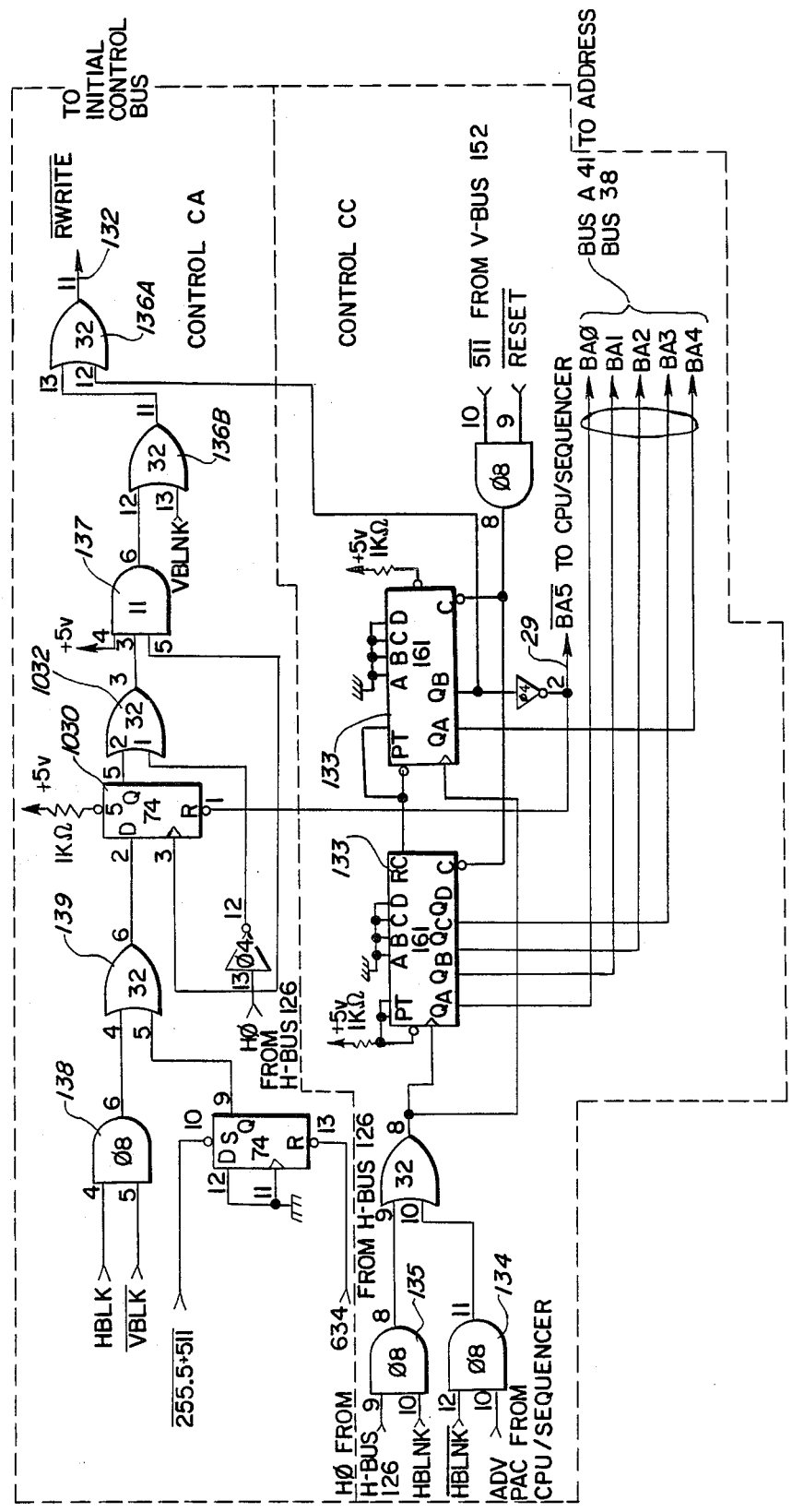
Figure 4:
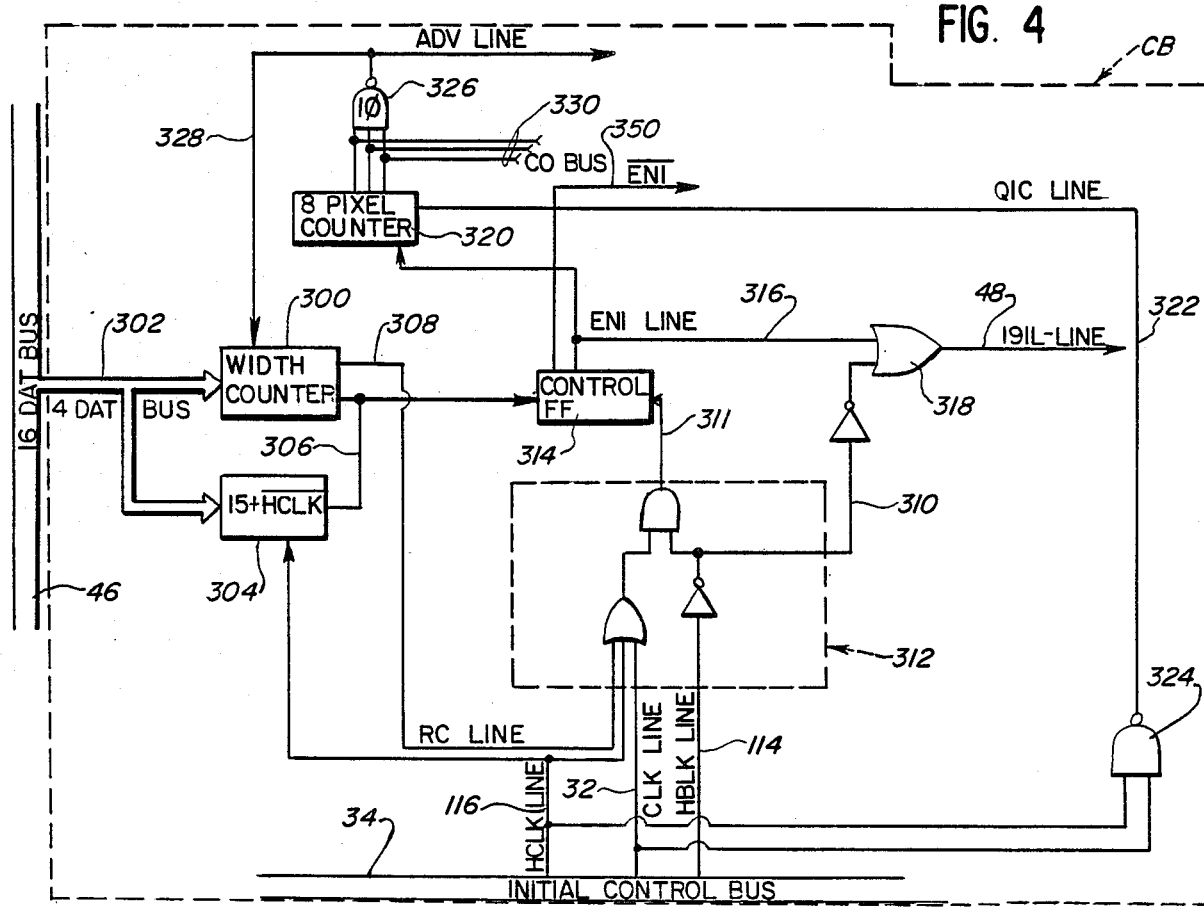

The B-control section 33 comprises a 1-of-2 multiplexer, three RAM's and various buses and data lines as will now be described with reference to FIG. 3 and in more detail in FIGS. 3a-1 to 3a-5, related as shown in FIG. 3a-6.

Figure 3:
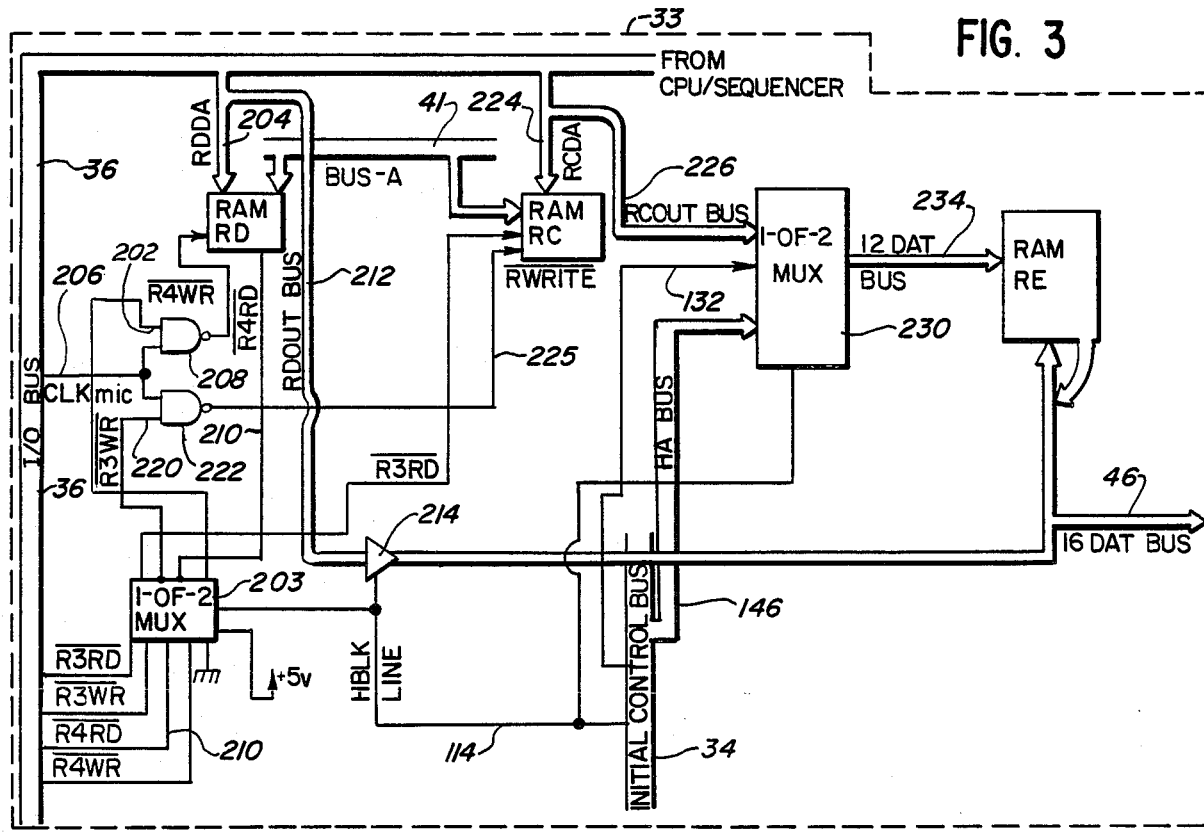
Figures 1, 3A:
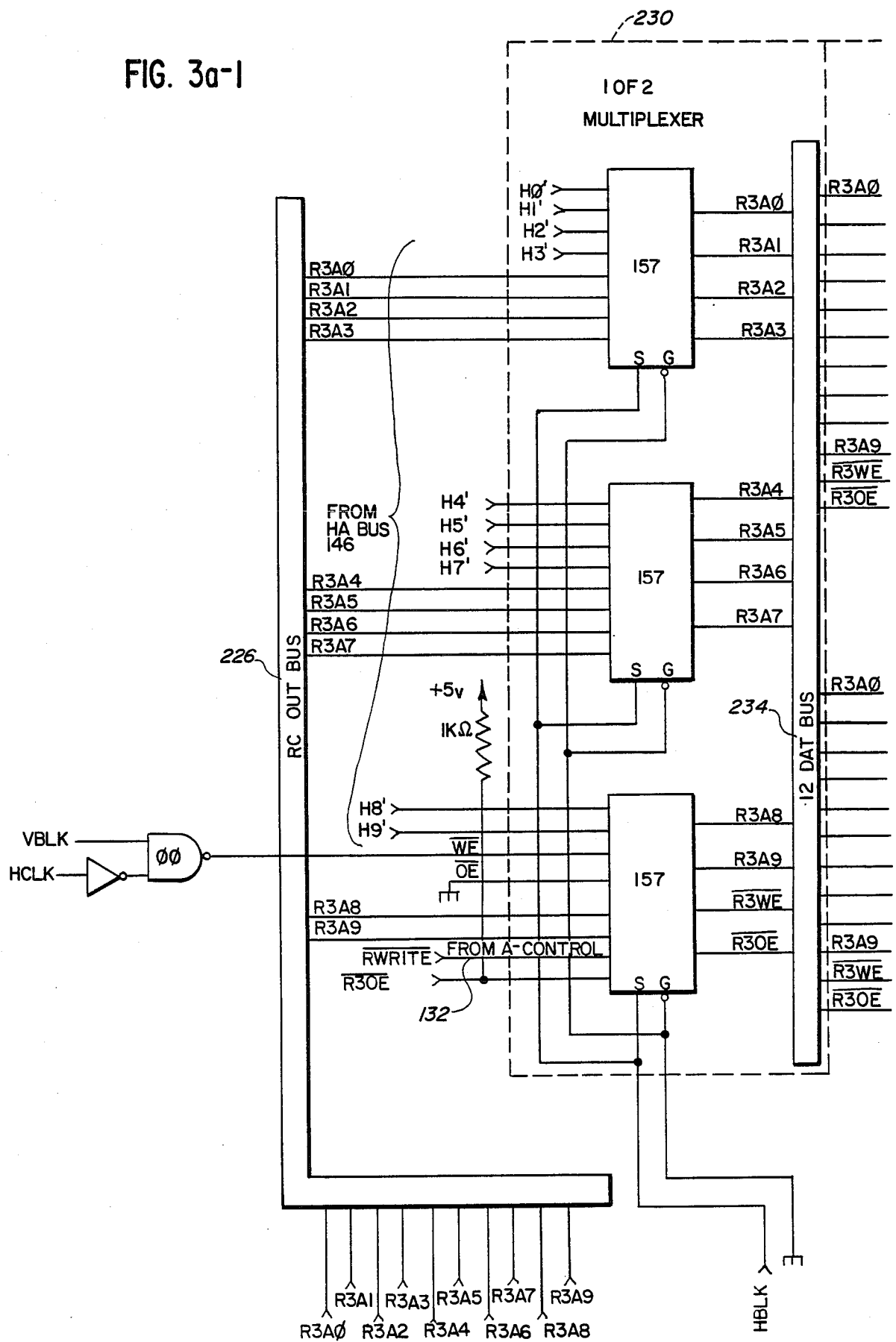
Figures 2, 3A:
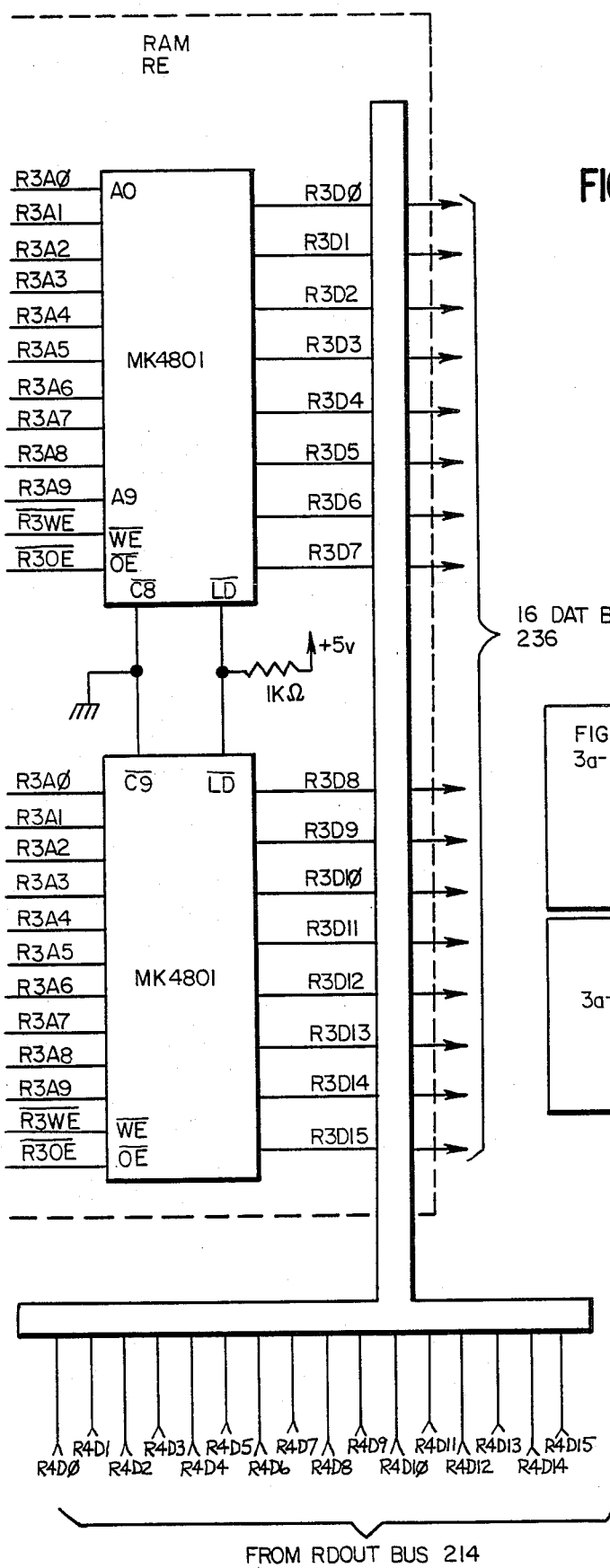
Figures 3, 3A, 4, 5, 6:
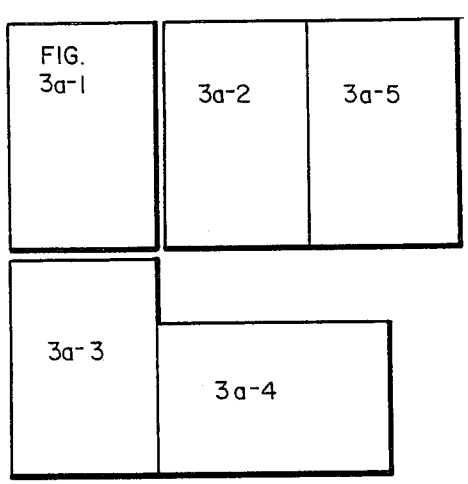
Figures 3, 3A:
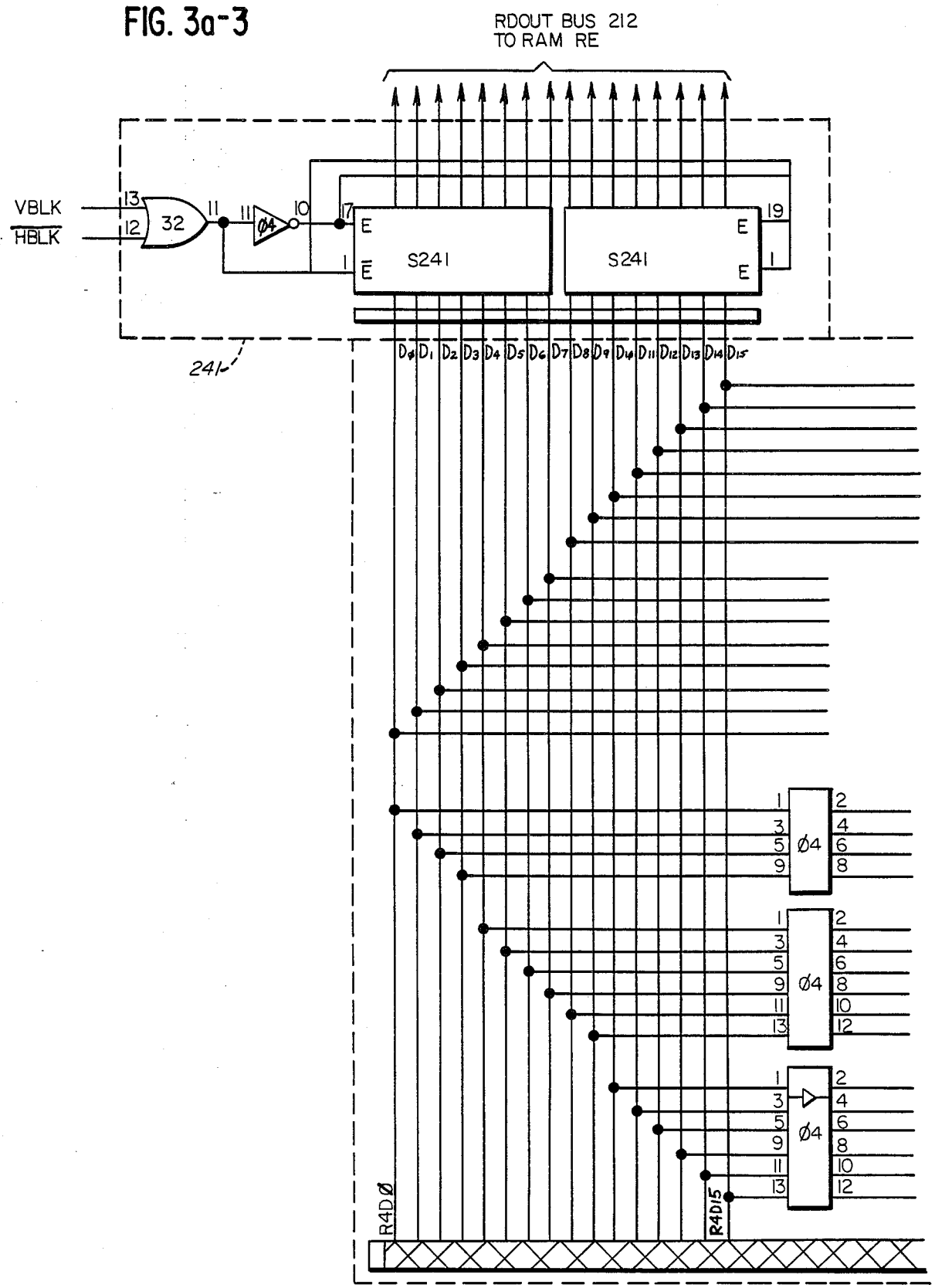
Figures 3, 3A, 4:
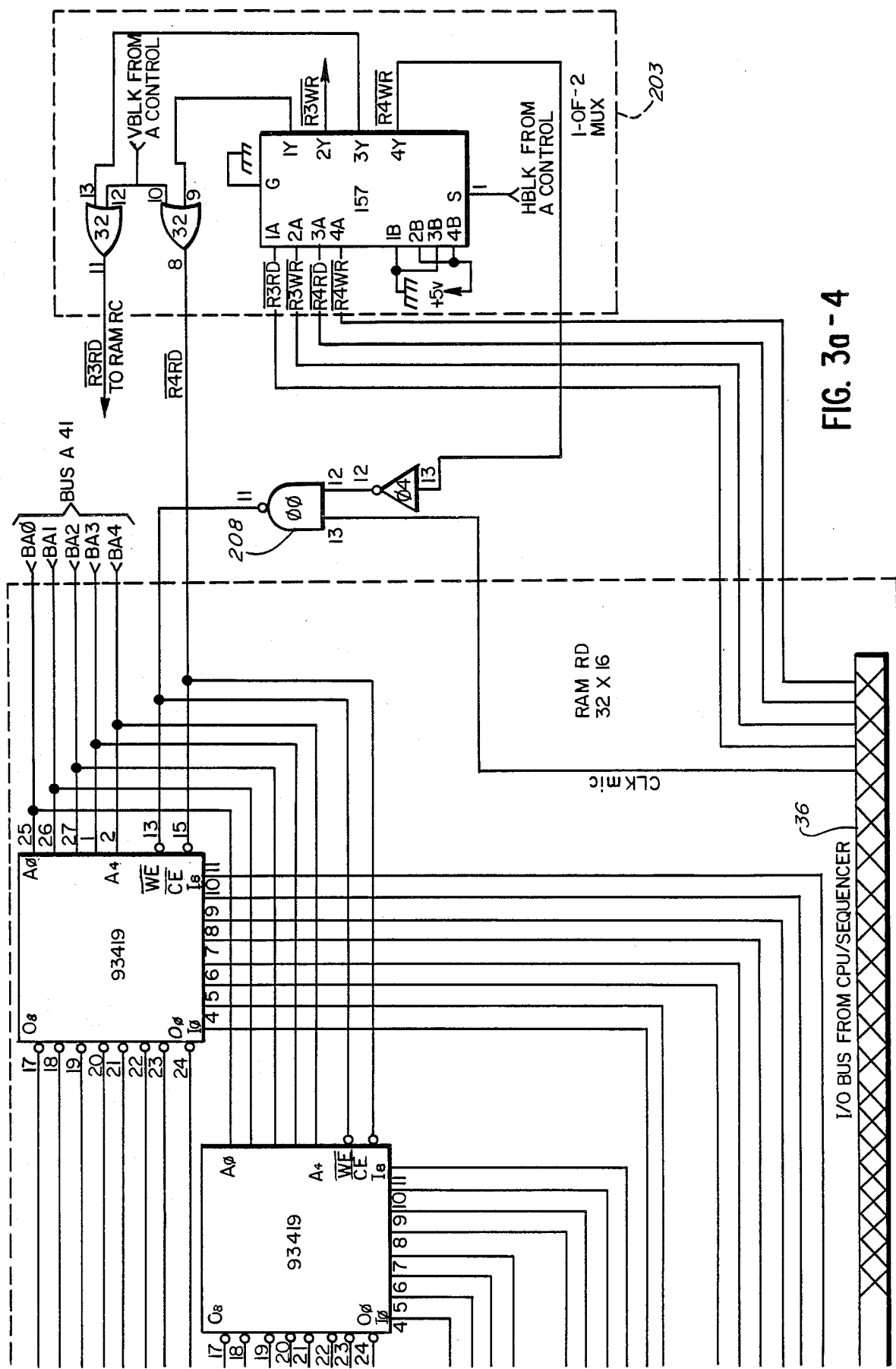
Figures 3, 3A, 4, 5:
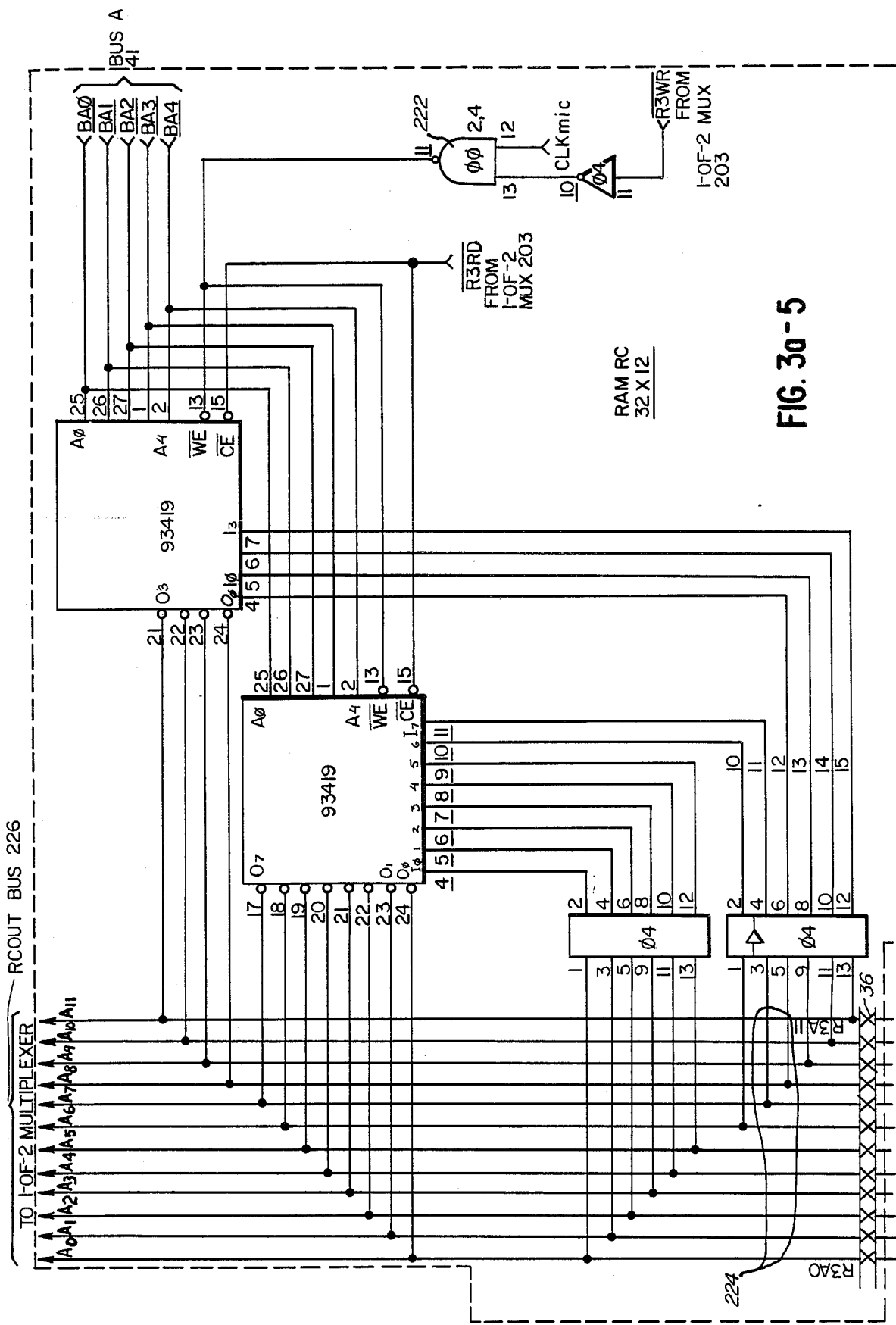

A RAM RD may be a 32×16 RAM controlled by the CPU/sequencer 24 as may be seen in detail in FIG. 3a-4. The RAM RD is addressed by bus A 41 which, it will be recalled, carries the current count from 0 to 31 issuing from the control CC.

The CPU/sequencer 24 issues 32 write signals to the RAM RD on an R4WR* line 202 from the I/O bus 36 through a 1-of-2 quadruple multiplexer 203 during the time a horizontal line is being displayed. Upon receipt of each write signal, the RAM RD writes 16 data bits from 16 RDDA lines 204 of the I/O bus 36. The CPU/sequencer supplies the data on the RDDA lines and also provides a 100 ns. clock pulse on a CLKmic line 206 to gate the write signal through a NAND gate 208, as will be explained. The CPU/sequencer is also signaling the A-control 14 to increment the current count on bus A 41 by issuing pulses on the ADVPAC line 26, as explained earlier.

Data on the RDDA lines 204 during each write consist of an address in a picture ROM (to be discussed) and a width for one object to be displayed. Each such address comprises the beginning address in the picture ROM of an object description, and each such width is the width the object will occupy on the screen, where the width is expressed as a number of 8-pixel groups between 0 and 15. The specific construction utilizes 12 bits of data for the picture ROM address and 4 bits for the width.

Data are also read out of the RAM RD under the control of control CC during HBLK. As the A-control 14 performs its 32 writes, bus A 41 carries the current count from 0 to 31 which constitutes the address input to the RAM RD. The R4RD* line 210 is forced low during HBLK by the 1-of-2 multiplexer 203 as shown in FIG. 3a-4, enabling the RAM RD to read out in sequence the picture ROM addresses and widths for up to 32 objects to be displayed in the next line. In the specific construction the RAM RD output is fed over an RDOUT bus 212 through a line driver 214 which is only active during HBLK, as indicated by the HBLK line 114 connection in FIG. 3. The RDOUT bus connects through the line driver to the I/O pins of a RAM RE.

RAM RC is a 32×12 RAM which is also controlled by the CPU/sequencer 24. The CPU/sequencer issues write signals to the RAM RC on an R3WR* line which enables RAMRC through a NAND gate 222 using the same clock pulses that enable the RAM RD writes. RAM RC thereupon writes data from 12 RCDA lines 224, that data comprising a sequence of up to 32 addresses in a line buffer. The RCDA lines carry their data from a RAM RB in the input section. The line buffer addresses comprising the data on the RCDA lines are the addresses of the starting pixel numbers (horizontal positions) on the screen of each of the 32 (or fewer) objects to be exhibited in the next horizontal trace. Although 12 lines are provided, only 10 are actually needed to follow the horizontal count in the specific construction.

Data are read out of the RAM RC under the control of control CC which addresses RAM RC on the bus A 41 with the same 32 address counts used in the RAM RD readout. An R3RD* line from the 1-of-2 multiplexer 203 is always low during HBLK, as may be seen in FIG. 3a-4. The RAM RC reads out its data on an RCOUT bus 226 to one set of inputs of a 1-of-2 multiplexer 230.

The second set of inputs to the 1-of-2 multiplexer 230 is the HA bus 146 of the initial control bus 34 carrying counts 1 to 512 corresponding to the current horizontal beam position (or pixel number) on the screen of the video monitor 54.

In the specific construction the CPU/sequencer 24 controls the read/writes of the RAM's during horizontal line display. For example, it controls RAM RD by activating simultaneously the R4WR* line 202 and the R4RD* line 210. A signal from the CPU/sequencer on the R4RD* line enables the memory of the RAM RD which may comprise a pair of Fairchild 93419 64×9 RAM's connected to provide storage locations used as 32 12-bit locations. A simultaneous signal on the R4WR* line is inverted and fed to the WE* pins of these RAMs through the NAND gate 208. The NAND gate 208 is enabled by the 100 ns. when the clock pulses are high, the RAM RD writes.

The writes into the RAM RD are addressed by the control CC. The control CC is clocked by pulses on the ADVPAC line 26 from the CPU/sequencer 24. It will be recalled that the control CC counts from 0 to 31 and outputs its count on the bus A 41. The bus A 41 connects to the address pins on the RAM RD. Thus, one pulse on the ADVPAC line 26 for each object to be displayed will cause a 12-bit word to be read into the RAM RD at each of 32 or fewer sequential address locations, in accordance with the fast data transfer feature of the present invention.

Control of RAM RC is analogous to control of RAM RD.

The output of the 1-of-2 multiplexer 230 is controlled by the HBLK line 114 as indicated in FIGS. 3 and 3a-1. The HBLK line 114 selects the RCOUT bus 226 and RWRITE line 132 as inputs during HBLK, and the current horizontal count from the HA Bus 146 during line drawing. During HBLK the next to the most significant digit input to the 1-of-2 multiplexer consists of the 32 sequential pulses on the RWRITE line 132. Each pulse is approximately simultaneous with a corresponding address count from the control CC, which causes the RAM RC and the RAM RD to read out their data as already described. The 1-of-2 multiplexer thereby outputs the (up to) 32 addresses from the RAM RC during HBLK.

When the HBLK line is low, the multiplexer outputs the 10-bit current horizontal position from the HA bus as the 10 least significant digits.

In the specific construction the input data to the 1-of-2 multiplexer 230 is a 12-bit binary number. The first 10 bits are data from the RCOUT bus 226 or HA bus 146. The RWRITE line 132 comprises an eleventh bit, inputted with the RCOUT data. A twelfth bit with RCOUT is pulled high. When the HA bus is selected, the eleventh bit is the logical sum of VBLK* or HCLK. When HBLK is low, therefore, the eleventh bit is high during vertical blanking and follows HCLK when blanking is off. The twelfth bit is pulled low. These eleventh and twelfth bits are, respectively, write and read bits for the RAM RE, as will be seen.

The output of the 1-of-2 multiplexer 230 is connected to the ten address pins and two enable pins of the line buffer RAM RE by a 12 DAT bus 234. The two enable pins correspond to the write-read bits inputted to the 1-of-2 multiplexer.

During HBLK the 16 bits of picture ROM data on the RDOUT bus are on the I/O pins of the RAM RE. Each write on the RWRITE line 132 causes RAM RE to write the RDOUT data from the RDOUT bus 212 from its I/O pins. The address where each word of RDOUT data is stored in the RAM RE is supplied by the 10 bits of data on the RCOUT bus 226 at the time of the write.

The RAM RE is in effect a map of one horizontal line; each address from 0 to 512 corresponds to a pixel on the next horizontal line to be drawn. The RDOUT data places a word at each location address that corresponds to the beginning (leftmost) horizontal position of an object.

Each address in the RAM RE carries 16 bits of data. The 16 I/O pins of the RAM RE connect to a 16 DAT bus 46. From the 16 DAT bus 46, 12 bits go to an out latch and 4 to a control CB, both in the readout section 44. The 16 DAT bus 46 also connects to the RDOUT bus 212 from the RAM RD through the line driver 214, which is only activated during HBLK, thereby providing the input data for the 32 writes.

During horizontal trace, the output of the 1-of-2 multiplexer 230 addresses the memory location in the RAM RE corresponding to the current horizontal pixel count. That is, the 1-of-2 multiplexer output is carrying the 10-bit input from the HA bus 146, and the two enable bits are set to enable the RAM RE to read. The RAM RE is therefore reading out whatever 12 bit ROM address corresponds to the current horizontal pixel count during horizontal line drawings. Each ROM address is accompanied by 4 bits of width data.

Provision is also made to write into ROM RE during vertical blanking, but this provision is not used in the specific construction described herein.

The RAM RE may be selected, in a specific construction, to be a pair of Mostek MK 4801 1028×8 RAMs which output highs on all output pins when both of the enable bits are set high.

The Readout Section 44

The readout section 44 is shown in FIG. 5. The readout section 44 includes a control CB as shown in FIG. 4 and in more detail in FIGS. 4a and 4b. The control CB controls the readout section 44. Specifically, it controls the width of the object displayed during horizontal trace.

The control CB operates upon 4 bits of width data comprising the 4 most significant bits from the 16 DAT bus 46. The 4 bits of width data are fed to the input of a width counter 300 on a 4 DAT bus 302. The Input to the width counter 300 will contain the binary equivalent of 15 when no counts are to be counted.

Figure 4A:
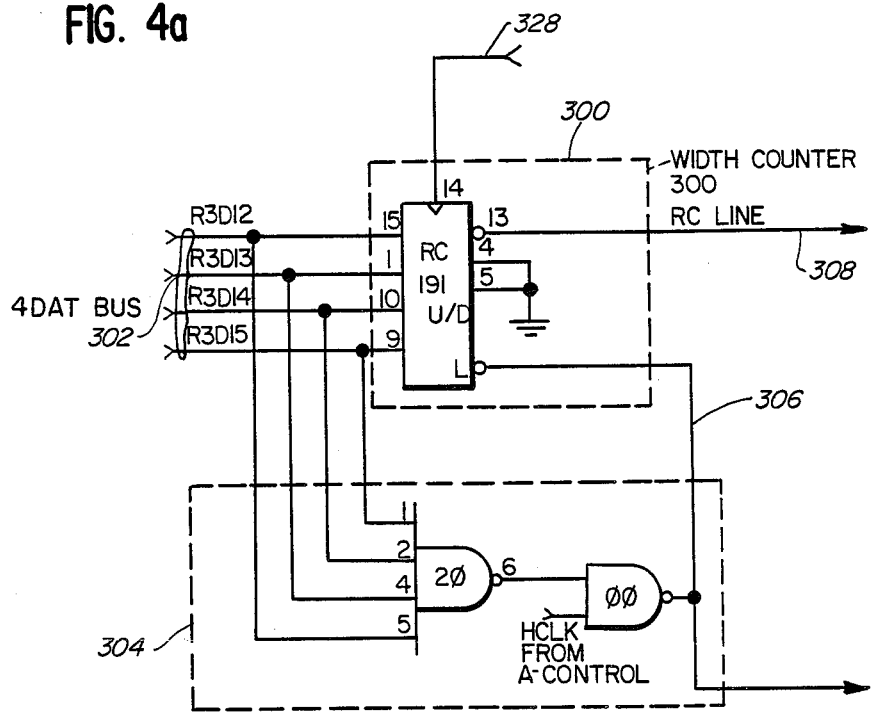
FIG. 4a is a circuit diagram of a particular implementation of the width counter and the 15 or HCLK* components of the control CB subsection shown in FIG. 4.
Figure 4B:
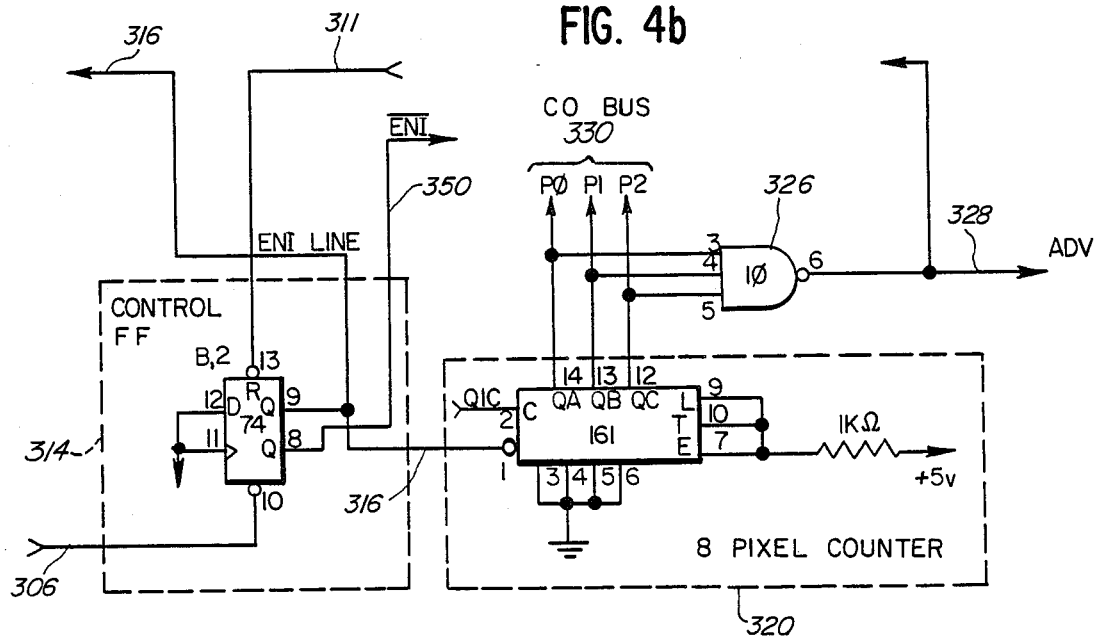
FIG. 4b is a circuit diagram of a particular implementation of the control FF and 8-pixel counter subsections of the control CB subsection shown in FIG. 4.

The input to the width counter 300 is sampled by a 15 or HCLK* gate 304 which outputs a low on a 15 or HCLK* line 306 when the input to the width counter changes from 15, as may be seen by reference to FIG. 4a.

Prior to that time, the ripple clock of the width counter 300 outputs a high on an RC line 308 as may be seen by reference to FIG. 4a. A disable line 311 from an (RC or CLK or HCLK) and HBLK* gate 312 carries a high to the clear pin of a control 7474 flip-flop 314 with grounded D-input and clock.

The 15 or HCLK* line 306 is connected to the preset pin of the control flip-flop 314; the stable output from the Q pin of the control flip-flop is a low on an ENI line 316, as will be seen subsequently. An ENI* line 350 carries the complement of the signal on the ENI line from the complementary output of flip-flop 314.

The 191L* line 48 is the output of an (HBLK or ENI) gate 318 and is discussed further in connection with picture output. The 191L* line therefore carries a low while the input to the width counter is set to 15 during horizontal line drawing.

When the input to the width counter 300 changes from 15, the 15 or HCLK* line 306 goes low when HCLK makes an up transition at about the beginning of the next horizontal pixel display, thereby driving the ENI line 316 and, consequently, the 191L line 48 high.

The ENI line 316 is also connected to the load pin of an 8-pixel counter 320 which has its four input pins set low. A Q1C-clock line 322 from a logic circuit equivalent to a NAND gate 324 shown schematically in FIG. 4 clocks the counter 320 with a rising transition about 25 nsec. after each pixel count. Inputs to the NAND gate 324 comprise the CLK line 32 and HCLK line 116. A divide-by-eight NAND gate 326 responds to the least significant three outputs of the 8-pixel counter and outputs on an ADV line 328. The ADV line 328 therefore goes low on every seventh count of the Q1C clock and then rises on the eighth count so long as the ENI line is high. The outputs of the 8-pixel counter feed a CO bus 330.

System operation may be understood by recalling that the RAM RE outputs on the 16 DAT bus 46 change during line drawing substantially synchronously with the current pixel count in the A-control section 14. When no data are to be presented for a current pixel, the 16 DAT bus 46 carries all 1's. Consequently the 4 DAT bus 302 carries a 15 and the 15 or HCLK* line 306 is high. When the data on the 4 DAT bus change from 15, the 15 or HCLK* line 306 goes low when HCLK goes high to commence a new pixel count. The low from the 15 or HCLK* gate 304 lasts one-half HCLK cycle after the width counter input changes. The output line 306 from the gate 304 connects to the load pin 1 of the width counter 300. The low from the 15 or HCLK* gate 304 therefore loads the data from the input pins of the load counter into the counter 300, and the subsequent high enables the counter 300. The next low on HCLK will again disable the counter 300 if the data on the input pins are not changed back to a binary coded 15 to fix the output of the 15 or HCLK* gate 304 at high. When new 4-bit data input is provided, it will be loaded into the counter 300, taking priority over any data in the counter at that time.

The ADV line 328 provides a clock pulse for the width counter 300 on every eighth count of the Q1C line, that is, on every eighth pixel. The width counter counts in the fashion just described until its count reaches 15. Seven counts later on the Q1C line 322, the ripple clock output of the width counter on the RC line 308 goes down and up synchronously with the signal on the ADV line 328.

While the RC line 308 is low, a low occurs on the disable line 311 from the (RC or CLK or HCLK) and HBLK* gate 312 one CLK cycle after the ADV line 328 goes low, thereby driving the clear pin of the control flip-flop 314 low and then high. The ENI line 316 is thereby driven low, resetting the 8-pixel counter to zero and leaving it disabled.

System operation after the disable line 311 returns to its high, approximately 25 ns. after the beginning of the low just described, now depends upon the data at the input to the width counter 300. If the data comprise a binary coded 15, then the output from the 15 or HCLK* gate 304 is high and the ENI line 316 remains low. The control CB is therefore disabled.

If the width data is different from 15, then the data are loaded into the width counter 300 and counting resumes, as before.

The bit count input to the width counter is the complement modulo 16 of the number of eight pixel groups of an object that is to be presented, beginning with the current pixel being presented on the video screen. The ADV line 328 provides a rise upon the completion of each such group. The CO bus 330 provides the current count within such group.

Picture Output

Figure 5:
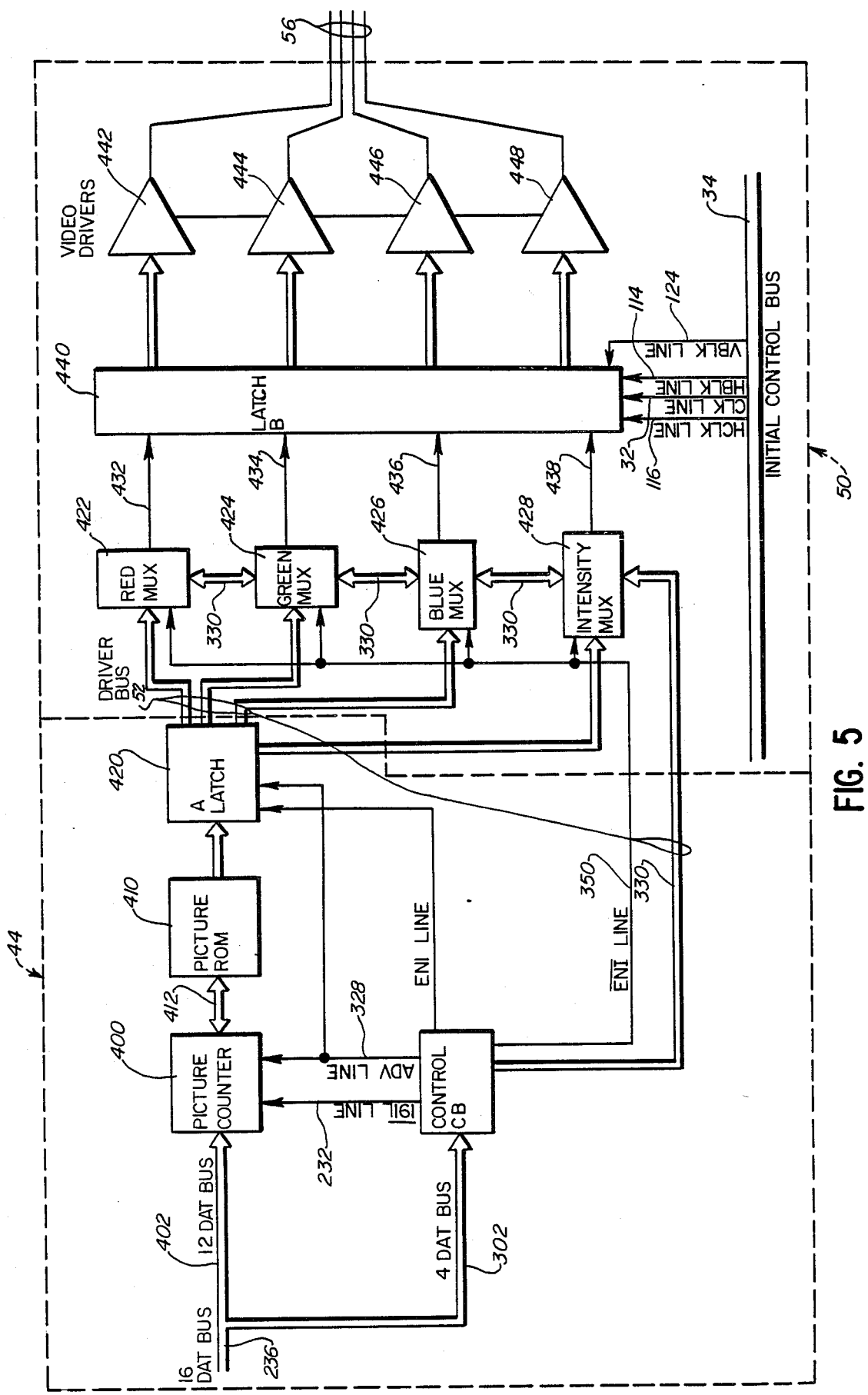
Figures 1, 5A:
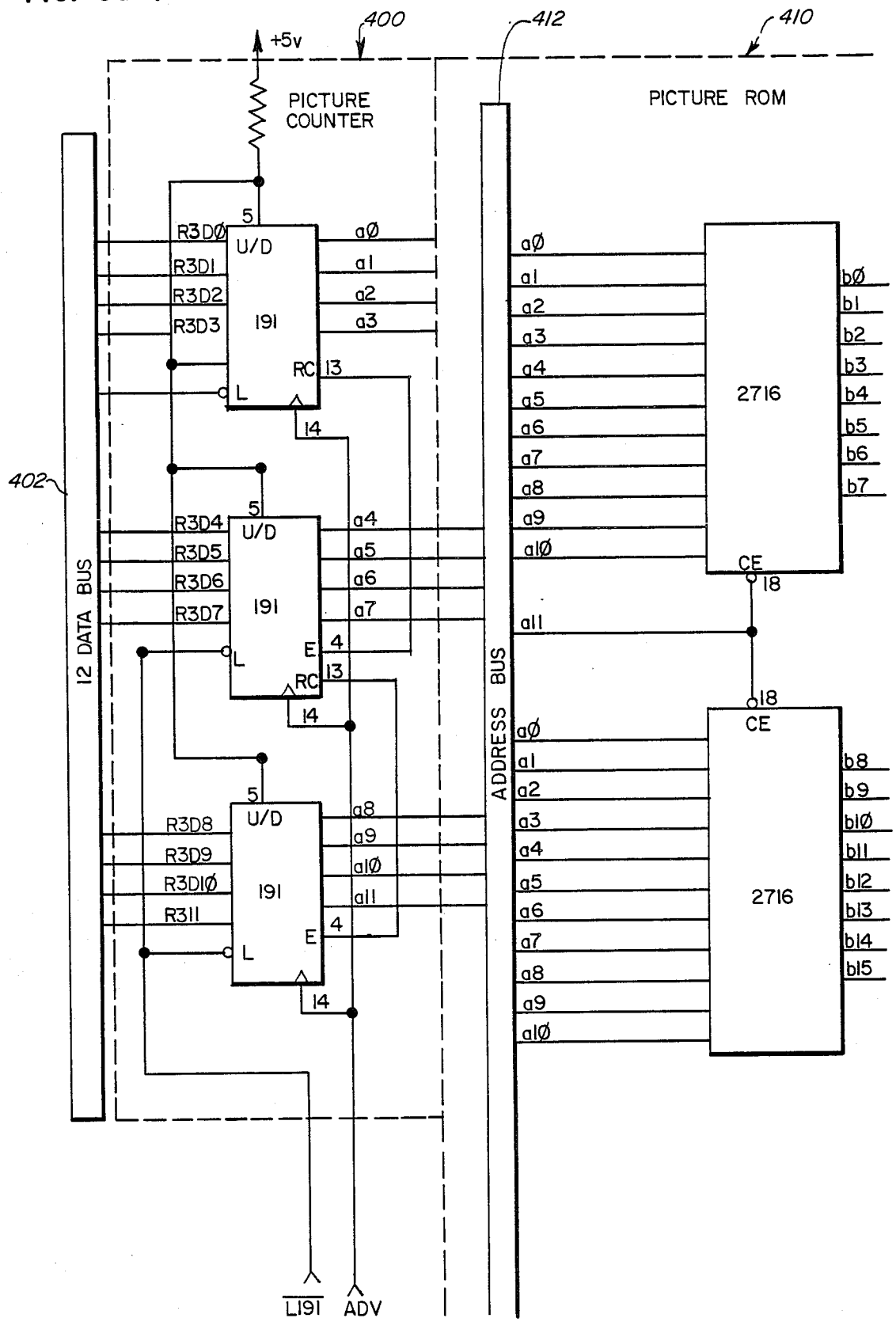
Figures 2, 5A:
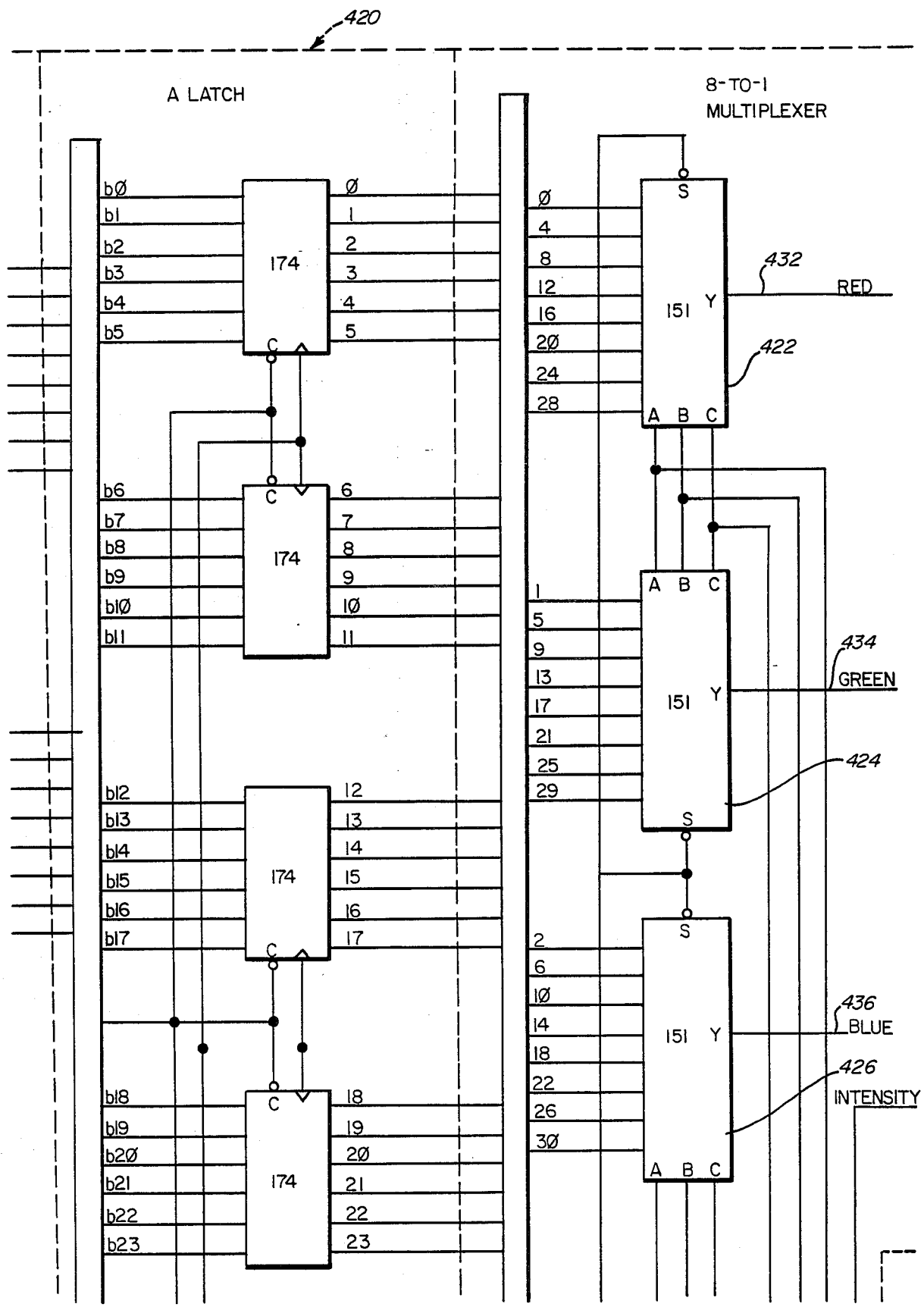
Figures 4, 5A:
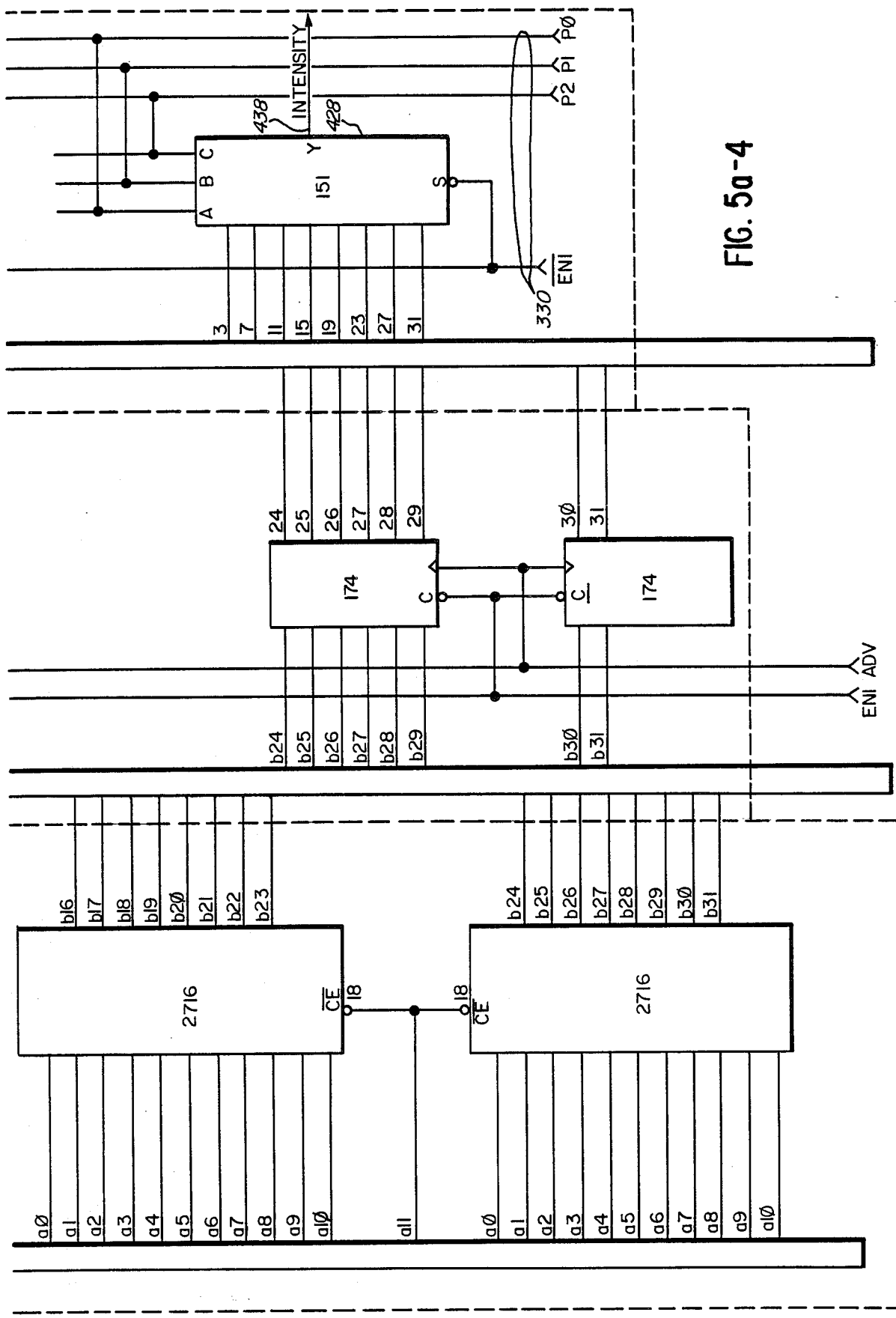

The remainder of the readout section 44 and the color interface section 50 are shown in FIGS. 5 and 5a-1 to 5a-4, related as shown in FIG. 5a-5. These are controlled by signals on the 191L* line 48 and the ADV line 328 from the control CB. During a horizontal trace, the 191L* line follows the level on the ENI line 316 shown in FIG. 4. The ENI line 316 is high during the time that the current horizontal pixels lie within the width of an object being traced. The 191L* line connects to the load pins of a picture counter 400, as may be seen specifically in FIG. 5a-1, which has the 12-bit part on 12 DAT bus 402 of the 16 DAT bus 236 data on its input pins. The picture counter 400 is clocked by the ADV line 328, which is also the line that clocks the width counter. Thus, when width data are loaded into the width counter, data remaining are loaded into the picture counter.

The input is consequently latched into the picture counter 400 when the 191L* line 48 goes low; after it goes high, the picture counter counts upward on the rises carried on the ADV line 328.

The 12-bit output of the picture counter 400 addresses a 2048×32-bit picture ROM 410 via an address bus 412. The 32 bits at each address comprise 4 bits of color data for each of eight pixels along a horizontal sweep. A sequence of such addresses thereby comprises a horizontal segment of an object to be displayed.

The 12 bits of address data from the RAM RC which are latched into the picture counter 400 by the 191L* line 48 constitute the picture ROM address of the beginning of a horizontal segment of an object. The width of the segment is controlled by the number of counts issued by the control CB on the 191L line.

The availability of 12 bits to address the picture ROM 410 makes it possible to use 4096×32-bit picture ROM's in the specific construction of the present embodiment. In the specific construction described herein, four 2716's were cascaded to provide the 32-bit output, the 12th address bit being used as an enable digit.

The output of the picture ROM 410 is clocked into an A latch 420 by the pulses on the ADV line 328 when the ENI line 316 is high. When the ENI line is low, all outputs of the A latch go low. Because of delays in the ROM output and the fact that the ENI line slightly leads the 191L* line, at any given instant the picture ROM output will contain data for the 8 pixels subsequent to the pixels whose data are in the A latch.

The 32-bit output of the A latch 420 inputs to an array of four 8-to-1 multiplexer/data selectors such as the Texas Instruments SN74151A. These comprise a red multiplexer 422, a green multiplexer 424, a blue multiplexer 426 and intensity multiplexer 428.

The three bits from the divide-by-eight counter 320 on the CO bus 330 from the control CB select the output of each of the four 8-to-1 multiplexers. The three bits count from 0 to 7 on the Q1C clock pulses in between the pulses on the ADV line 328. As the three bits count from 0 to 7, each of the four 8-to-1 multiplexers outputs in sequence the signals on the eight bits of input.

The four outputs of the 8-to-1 multiplexers carried on lines 432, 434, 436 and 438, respectively, are clocked into a latch B 440 synchronously with the horizontal clock pulses on the HCLK line 116 in the initial control bus 34 controlling the horizontal deflection. The four outputs from the latch B are then interfaced to respective video drivers 442, 444, 446, 448. The latch B is disabled by signals on the HBLK line 114 and VBLK line 124 from the initial control bus 34.

As may be seen from the foregoing, each 32-bit transmission from the picture ROM 410 is comprised of four 8-bit sequences, each sequence controlling one of three colors, or the intensity, for eight sequential horizontal pixels during a horizontal sweep. The position of the starting pixel is determined by the time of activation of the ENI line 316 which thereby controls the horizontal location of each object displayed.

The Input Section 10

The input section 10 provides an interface between the microprocessor 11 and the controller. In the specific construction the input section 10 is divided into even and odd subsections corresponding to the alternate vertical sweeps of the display, as shown in FIGS. 6 and 6a-1 to 6a-3, related as shown in FIG. 6a-4.

The microprocessor 11 transmits data on a control bus 502 within MP bus 12 upon receiving an interrupt signal on the interrupt line 18 from the A-control section. The interrupt is sent at the start of vertical blanking in the specific construction; the interrupt line therefore corresponds to the VBLK line 124 shown in FIG. 2.

A traffic control subsection 504 of the input section 10 provides signals on the DMASEL line 16A and RESET* line 16B. The DMASEL line goes high at approximately the beginning of the vertical blank and goes low approximately one vertical count before the end of vertical blanking. The RESET* line goes low for one horizontal count before the beginning of each horizontal line. The DMASEL and RESET* lines 16 carry signals utilized by the CPU/sequencer 24.

Figure 6:
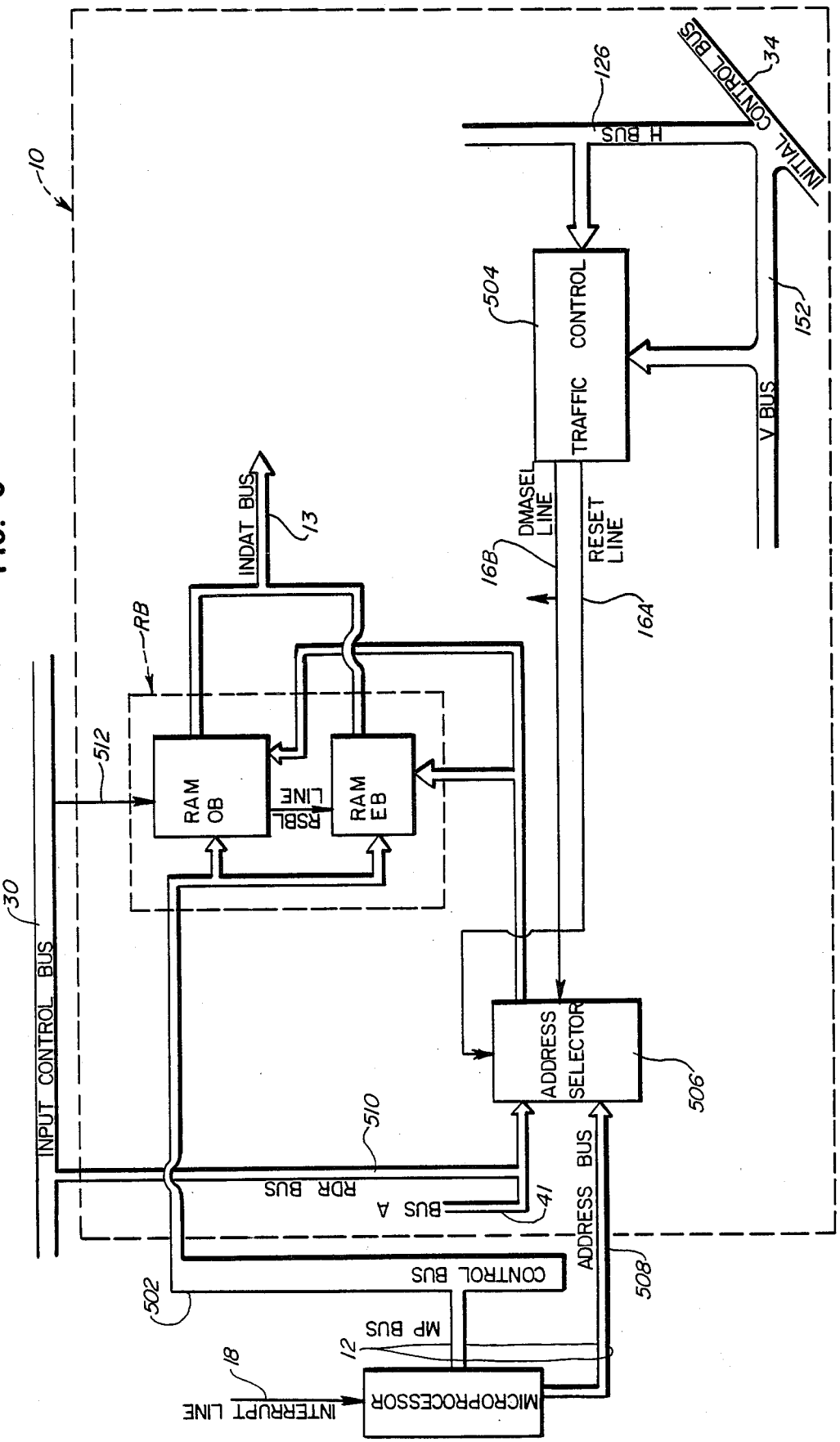
Figures 1, 6A:
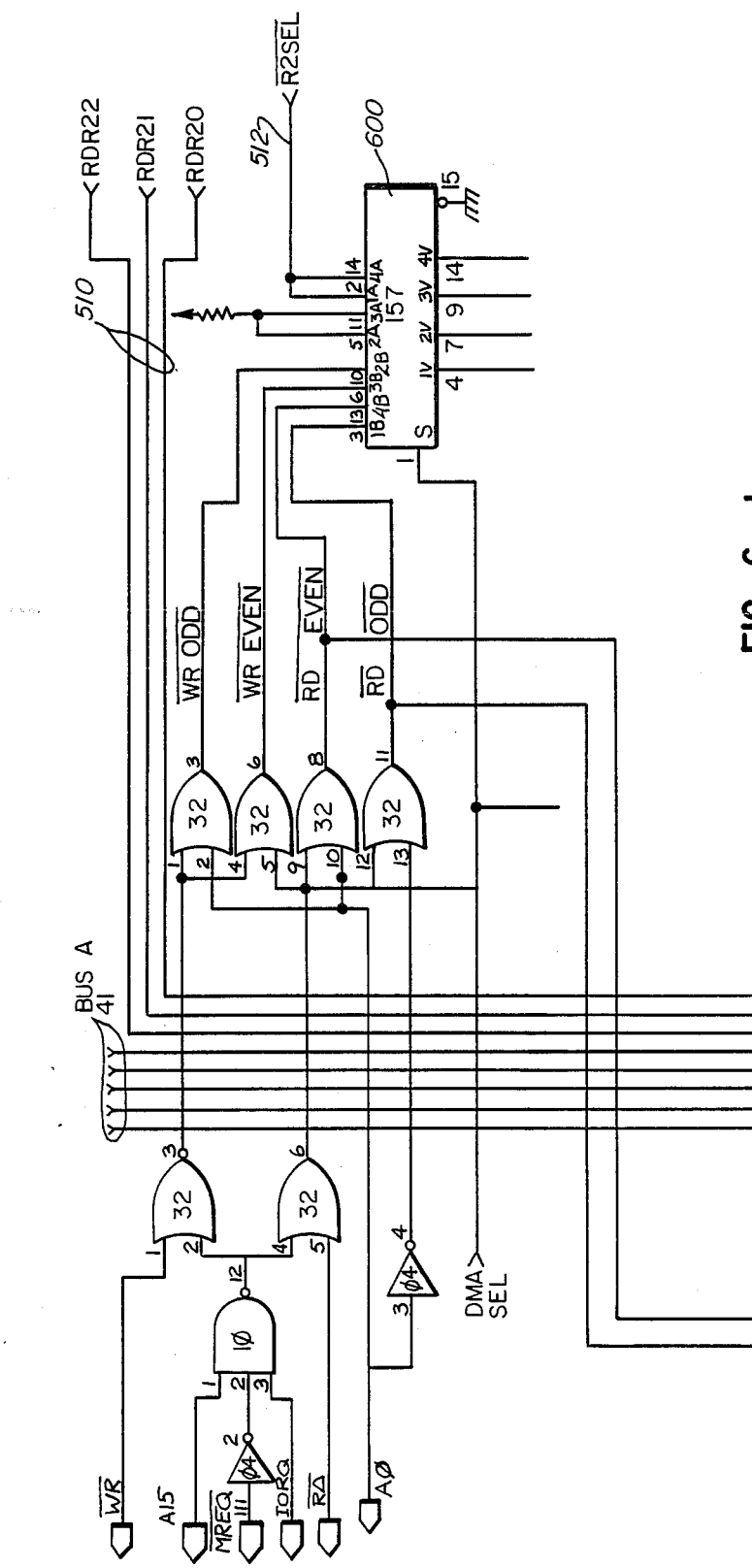
Figures 2, 6A:
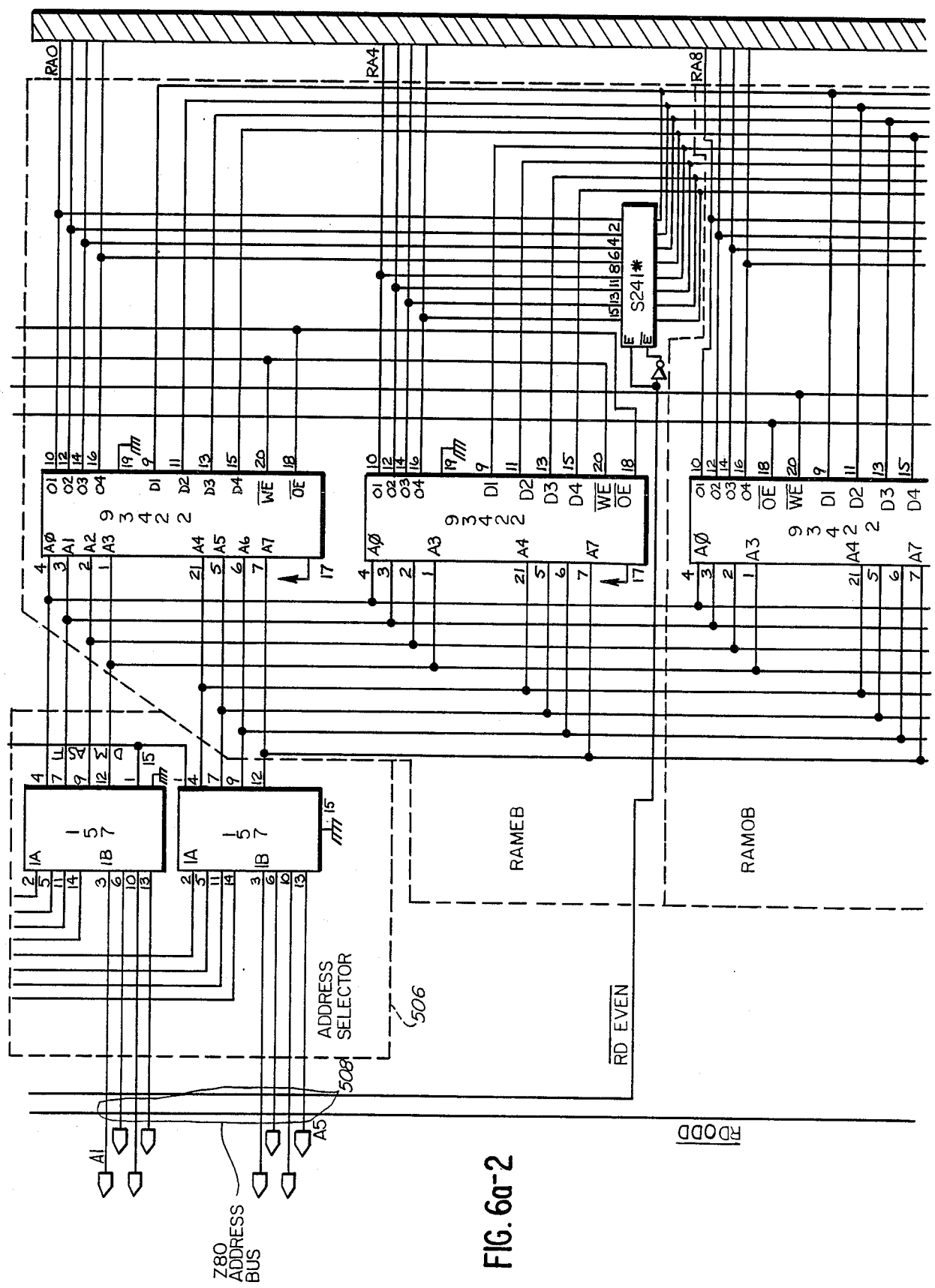
Figures 3, 6A:
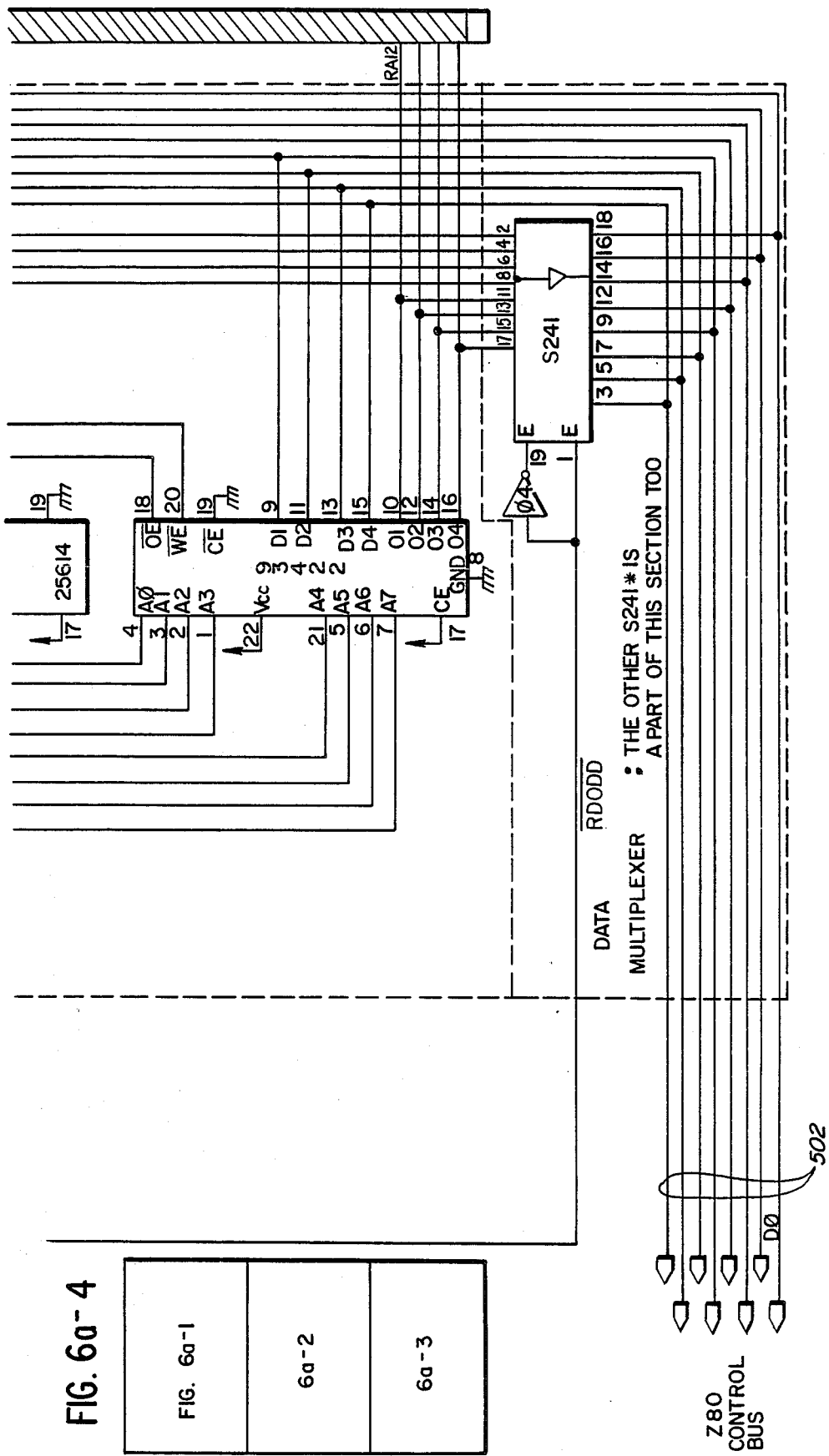

The DMASEL line 16A connects to the select pins of a pair of 2-line-to-1-line data selectors which comprise an address selector 506 as may be seen in FIGS. 6a-1 and 6a-2. When DMASEL is high, the address selector selects eight bits of address information from the microprocessor 11 on an address bus 508 within the MP bus 12. At other times the address selector 506 selects an 8-bit input consisting of the 5-bit output on bus A 41 from the A-control 14 and a 3-bit input on an RDR bus 510 in the input control bus 30 from the fast CPU/sequencer 24.

The address selector 506 in a specific construction outputs to the addresses of four 256×4 RAM's, together comprising a single input RAM RB and in pairs comprising a RAM OB and RAM EB, for odd and even data, respectively, as shown in FIGS. 6a-2 and 6a-3. During each vertical blanking period, the microprocessor 11 refreshes the RAM EB and the RAM OB by addressing them and loading them alternatively over the control bus 502. The input section utilizes the two eight-bit pairs of RAM's, alternately loaded, to read out 16-bit packets of data by combining data in corresponding addresses in the RAM OB and the RAM EB. The four RAM's together provide storage for data for up to 32 objects, with each object displayed described by 8 of the 16-bit packets or words as described more fully in the concurrently filed application.

Data for a single object display, as utilized in a specific construction, are shown in TABLE 1, as discussed below.

The data are read out of the RAM's, RAM OB and RAM EB, together comprising the single RAM RB for readout purposes, under control of the fast CPU/-sequencer 24. Readout is enabled by a low signal on an R2SEL* line 512 from the sequencer's input control bus 30 to a quadruple multiplexer 600 in the address selector 506, as shown in FIG. 6a-1. The select pin 1 of the quadruple multiplexer is controlled by the DMASEL line 16B. When DMASEL is high the quadruple multiplexer outputs control data from the microprocessor 11 which control read/writes of RAM's EB and OB. When DMASEL is low the two RAM's are enable to read as a single RAM RB. The CPU/sequencer is disabled during the time the RAM OB and the RAM EB are being refreshed by the microprocessor 11. The RAM RB output is made available to the CPU/-sequencer via the INDAT bus 13.

The hardware implementing a specific construction of the input section is shown in FIGS. 6a-1, 6a-2, and 6a-3.

CPU/Sequencer 24

The CPU/sequencer 24 rapidly loads the data from the RAM RB of the input section 10 into the RAM RC and the RAM RD of the B-control section 33. The contents of the RAM RC and RAM RD are read during the horizontal blanking period prior to display of the succeeding horizontal line. The RAM RC and the RAM RD, therefore, are loaded by the CPU/sequencer during display of the horizontal line preceding horizontal blanking, thereby updating these RAM's. The RAM RC and the RAM RD are also updated a short time prior to ending of vertical blanking in order to be available for the drawing of the first line.

The CPU/sequencer 24 is enabled and disabled by a timing control signal from the clock 100. The timing control signal provides 50 ns. clock pulses for the CPU/sequencer which, in the specific construction, are essentially synchronous with the CLK timing pulses. The timing control signal is disabled, however, during horizontal blanking. The timing control signal is also disabled during the part of the horizontal sweep when the CPU/sequencer is loading data for objects Nos. 25, 27, 29, and 31.

The CPU/sequencer 24 is the subject of said concurrently filed application where its functioning is described in detail. The functioning may be understood by reference to the following TABLE 1 which shows the data layout in the RAM RB storage for display of one single object.

TABLE 1

| RAM OB (upper byte) | RAM EB (lower byte) |
|---|---|
| (first object) | |
| BLANK | VDES (note 1) |
| BLANK | VSIZ (note 2) |
| HPOS (note 3) | BLANK |
| W1 (note 4) HGBN (note 5) | HGBN |
| BLANK | W2 (note 4) |
| BLANK | BLANK |
| BLANK | BLANK |
| BLANK | BLANK |
| (second object) | |

TABLE 1-continued

| RAM OB (upper byte) | RAM EB (lower byte) |
|---|---|
| . | |
| . | |
| . | |

Notes
1 desired vertical position
2 vertical size line count divided by 2
3 desired horizontal position
4 width (most significant ½ byte)
5 beginning ROM picture address (1½ bytes)

The term "byte" in TABLE 1 refers to 8 bits of storage in either RAM OB or RAM EB.

The CPU/sequencer 24 also accesses, in addition to the data in RAM RB, the 8-bits of data in register RA which represent the current vertical count, VCOUN.

The CPU/sequencer 24 then executes the procedure in TABLE 2 for each of the (up to) 32 objects specified in the RAM RB:

TABLE 2

| Step No. | Step |
|---|---|
| 1 | Enter |
| 2 | Set initial packet address in RAMRB at 000 |
| 3 | Y = VDES − VCOUN |
| 4 | If Y is not 0, go to Step No. 10 |
| 5 | Write HPOS in RAM RC |
| 6 | Write W1 and HBGN in RAM RD |
| 7 | Add 08 to initial packet address |
| 8 | Stop if initial address exceeds FF hexadecimal |
| 9 | Go to Step 3 |
| 10 | If Y is positive go to Step 7 |
| 11 | Z = VSIZ + Y |
| 12 | If Z is not zero go to Step 15 |
| 13 | Write all 1's to RAM RD |
| 14 | Go to Step 7 |
| 15 | If Z is positive, go to step 18 |
| 16 | Write all 1's to RAM RC |
| 17 | Go to Step 7 |
| 18 | Update data in RAM RD and add width to it |
| 19 | Go to step 7 |

It will, of course, be understood that modifications of the present invention in its various aspects will be apparent to those skilled in the art, some being apparent only after study and others being a matter of routine design. For example, it is not necessary to the invention that the game be a microprocessor controlled video game. Other types of amusement games may also utilize raster scan displays or use other means for generating game data, but nevertheless utilize the principles taught by the present invention. The number of pixels per line and of lines per display may be substantially increased by use of a faster clock within the teachings of the present invention. The scope of the invention, therefore, should not be limited by the particular embodiment and the specific construction herein described, but should be defined only by the appended claims and the equivalents thereof.

Various features of the invention are set forth in the following claims.

What is claimed is:

1. In a video display system having a first processing means for controlling system operations, a video display controller for controlling, independently of the first processing means, the display of a plurality of movable objects to form a video presentation of on a raster scan display, the video presentation being formed of a series of frames each frame being formed of a plurality of parallel scan lines comprising:

object memory means for storing a digital representation of each object to be displayed during a video presentation, said data being stored at fixed addresses;

input means for receiving data from said first processing means, said data representing addresses to said object memory means for the objects to be displayed during one frame of the video presentation and the locations at which said objects are to be displayed on the raster scan display;

line buffer memory means coupled to the input means for storing the address data to said object memory means for each object to be displayed on one scan line at positions within the line buffer memory means corresponding to the locations on the display at which the objects are to be displayed;

means coupled to the raster scan display for controlling the intensity of the display; and second processing means responsive to the data in the line buffer memory means for causing data in the object memory means for said one scan line to be transferred to the intensity control means to generate the scan line of the display from the object memory in real time.

2. The video display system of claim 1 wherein the first processing means communicates with the video display controller only during the time interval between the display of successive frames.

3. The video display system of claim 2 wherein the period of time during which the first processing means communicates with the input means is substantially less than the time interval between the display of successive frames.

4. The video display system of claim 1 wherein the data received by said input means includes data representing the width of each object to be displayed during one frame, said width data being stored in the line buffer means with the object memory address data for each object to be displayed on the scan line.

5. The video display system of claim 1 wherein the second processing means controls the transfer of data from the input means to the line buffer memory means.

6. In a video display system having a first processing means for controlling system operations, a video display controller for controlling, independently of the first processing means, the display of a plurality of movable objects to form a video presentation on a raster scan display, the video presentation being formed of a series of frames each frame being formed of a plurality of parallel scan lines comprising:

object memory means for storing a digital representation of each object to be displayed during a video presentation, said data being stored at fixed addresses;

input means for receiving data from said first processing means, said data representing the object memory addresses of the objects to be displayed during one frame of the video presentation and the locations at which said objects are to be displayed on the raster scan display;

first temporary storage means coupled to the input means for storing the object address data;

second temporary storage means coupled to the input means for storing object display location data;

line buffer memory means coupled to said first and second storage means for storing the object memory address data from said first temporary storage means for each object to be displayed on one scan line at positions within the line buffer memory means corresponding to the display location data stored in said second temporary storage means for said objects;

means coupled to the raster scan display for controlling the intensity of the display; and second processing means responsive to the data in the line buffer memory means for causing data in the object memory means for said one scan line to be transferred to the intensity control means to generate the scan line on the display from the object memory in real time.

7. The video display control system of claim 6 wherein said second processing means controls the transfer of data from the input means to said first and second temporary storage means.

8. The video display control of claim 7 wherein said second processing means controls the transfer of data sufficient for said one scan line to the first and second temporary storage means.

9. The video display system of claim 6 wherein said first processing means communicates with said video display controller only during the time interval between the display of successive frames.

* * * * *